Feb. 17, 1970   R. D. WOOTEN ET AL   3,496,048
CARTON LABELING MACHINE
Filed Aug. 4, 1964   20 Sheets-Sheet 5
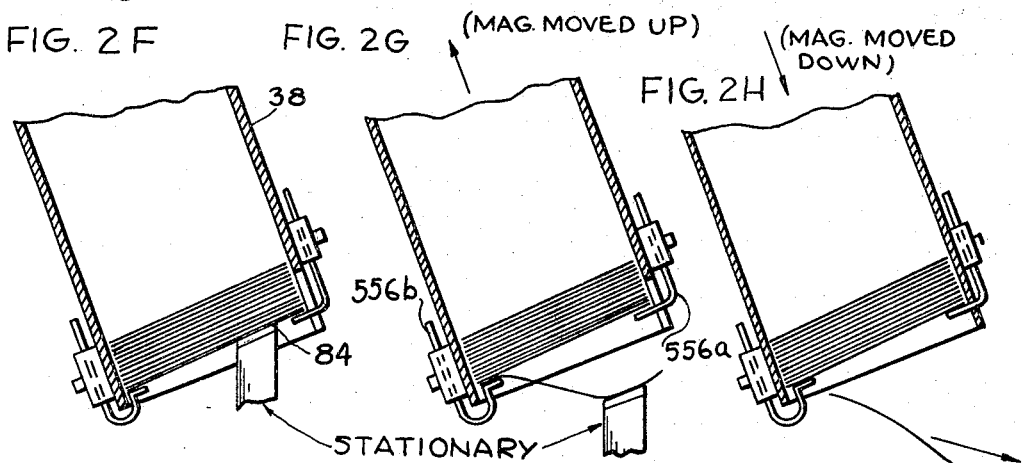
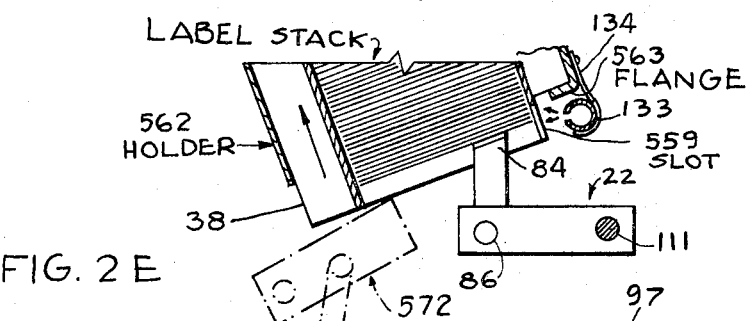
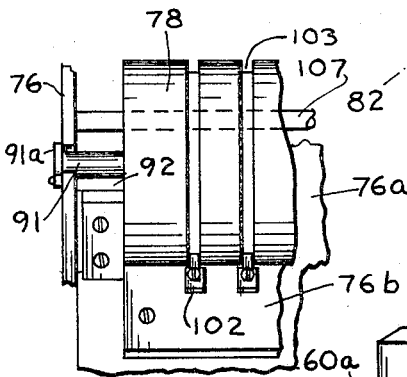
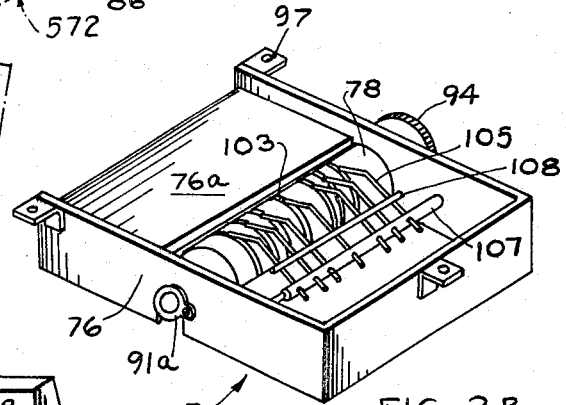
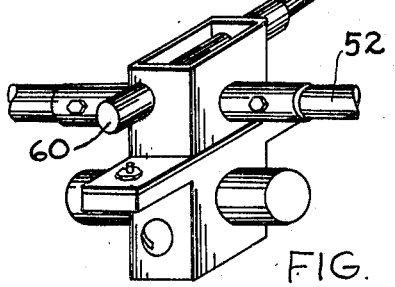
INVENTOR
RICHARD B. JOHNSON
R. DAVID WOOTEN
BY
Albert M. Galkind
ATTORNEY

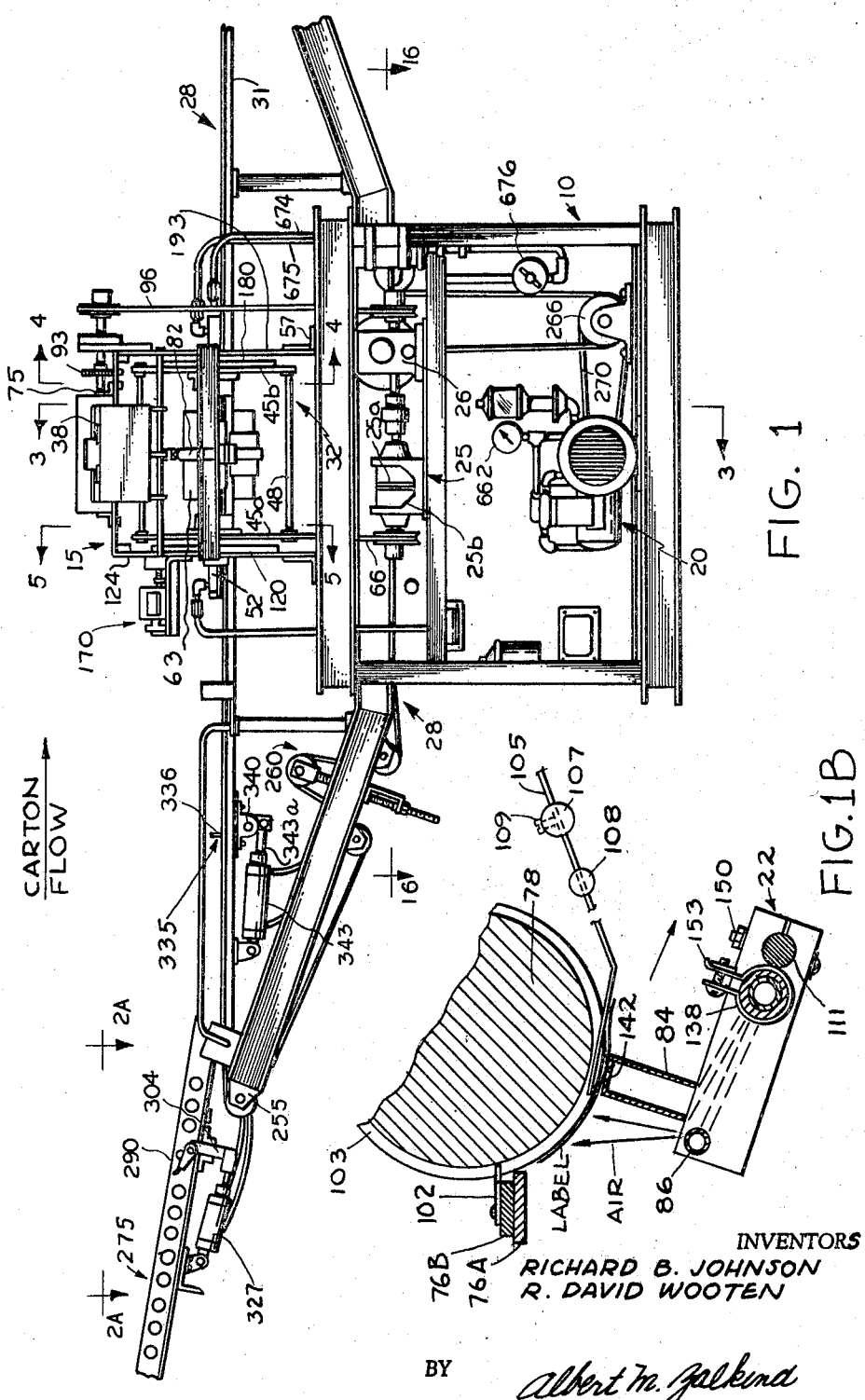

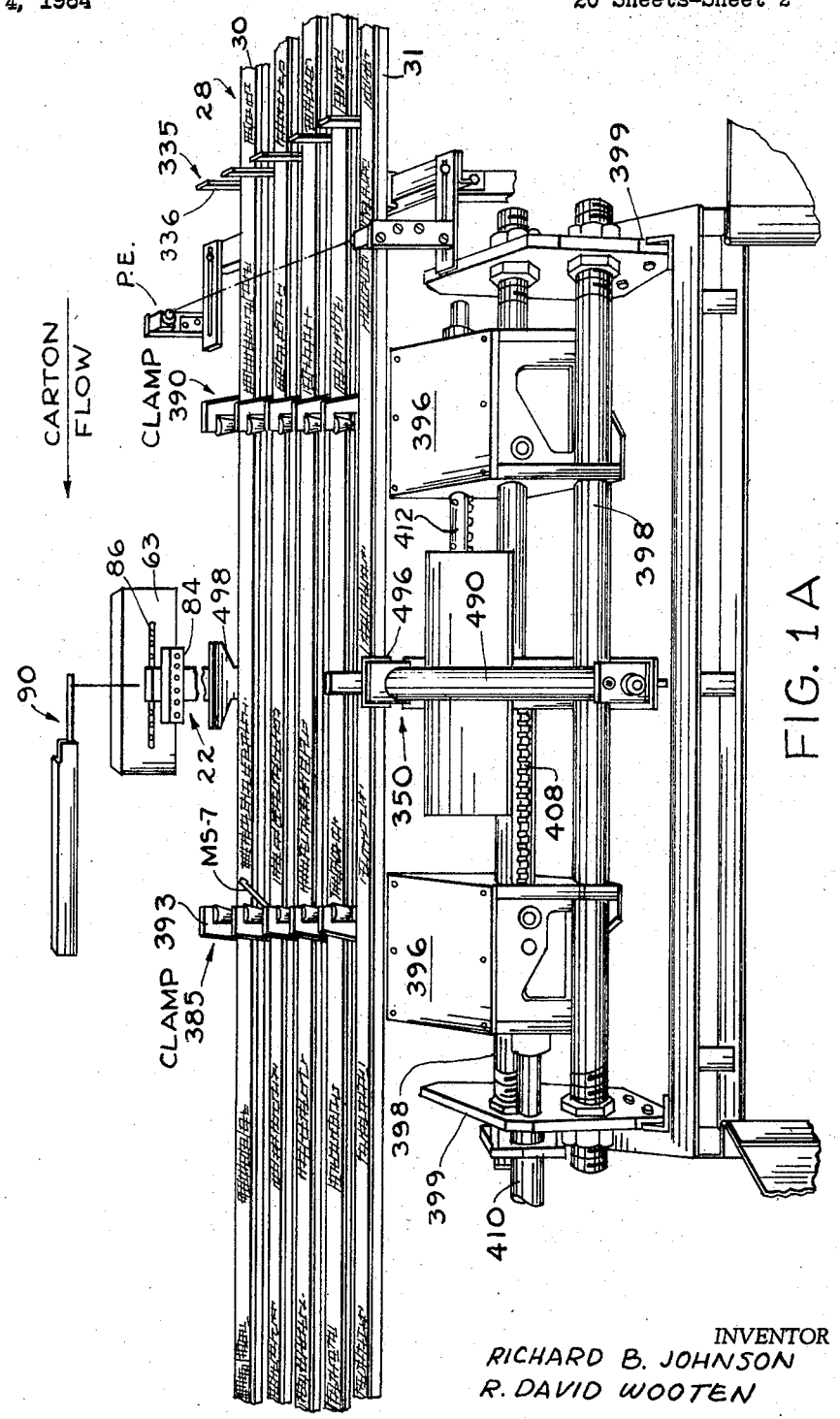

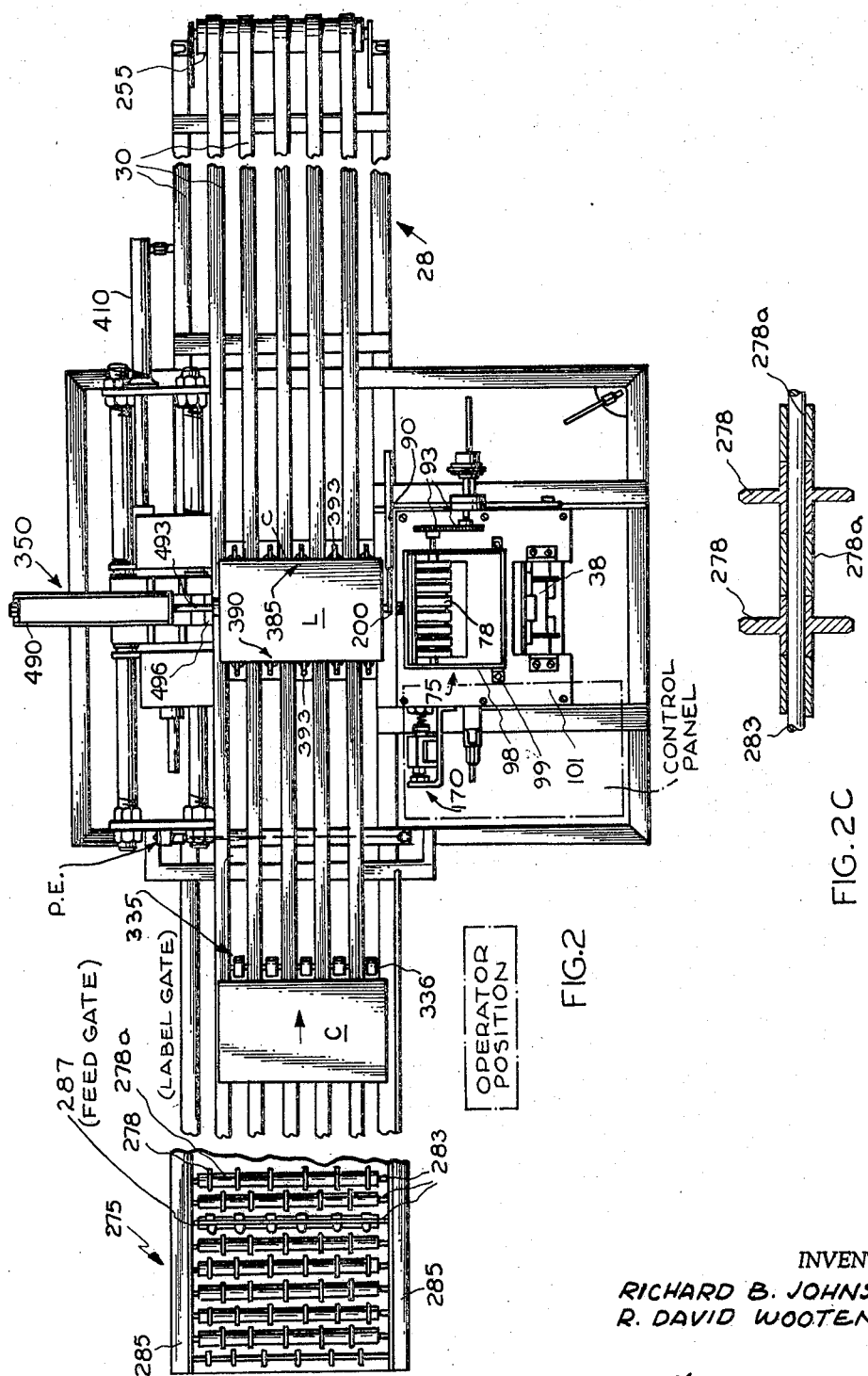

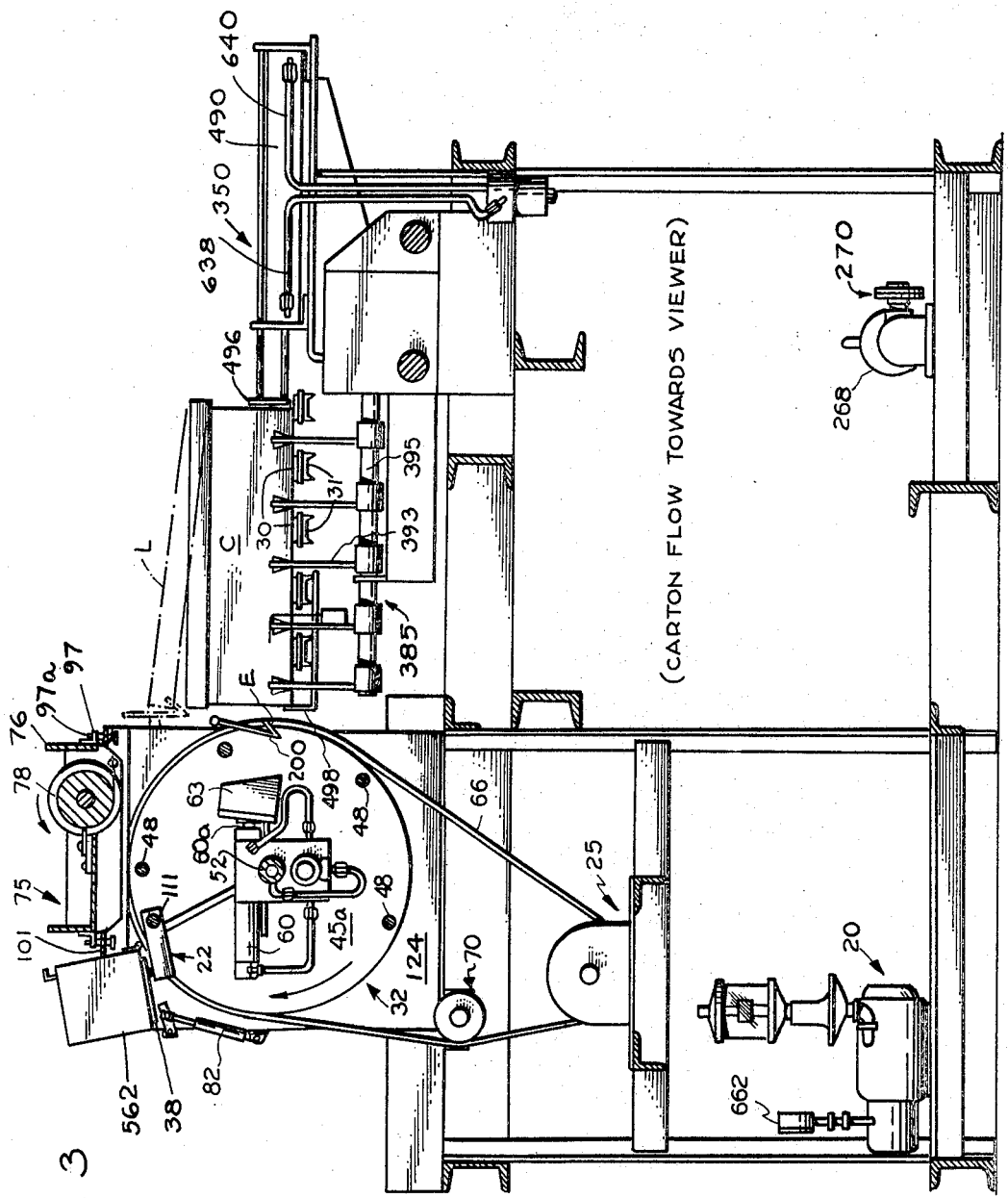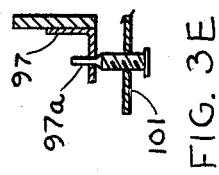

INVENTORS
RICHARD B. JOHNSON
R. DAVID WOOTEN

BY

Albert M. Zalkind
ATTORNEY

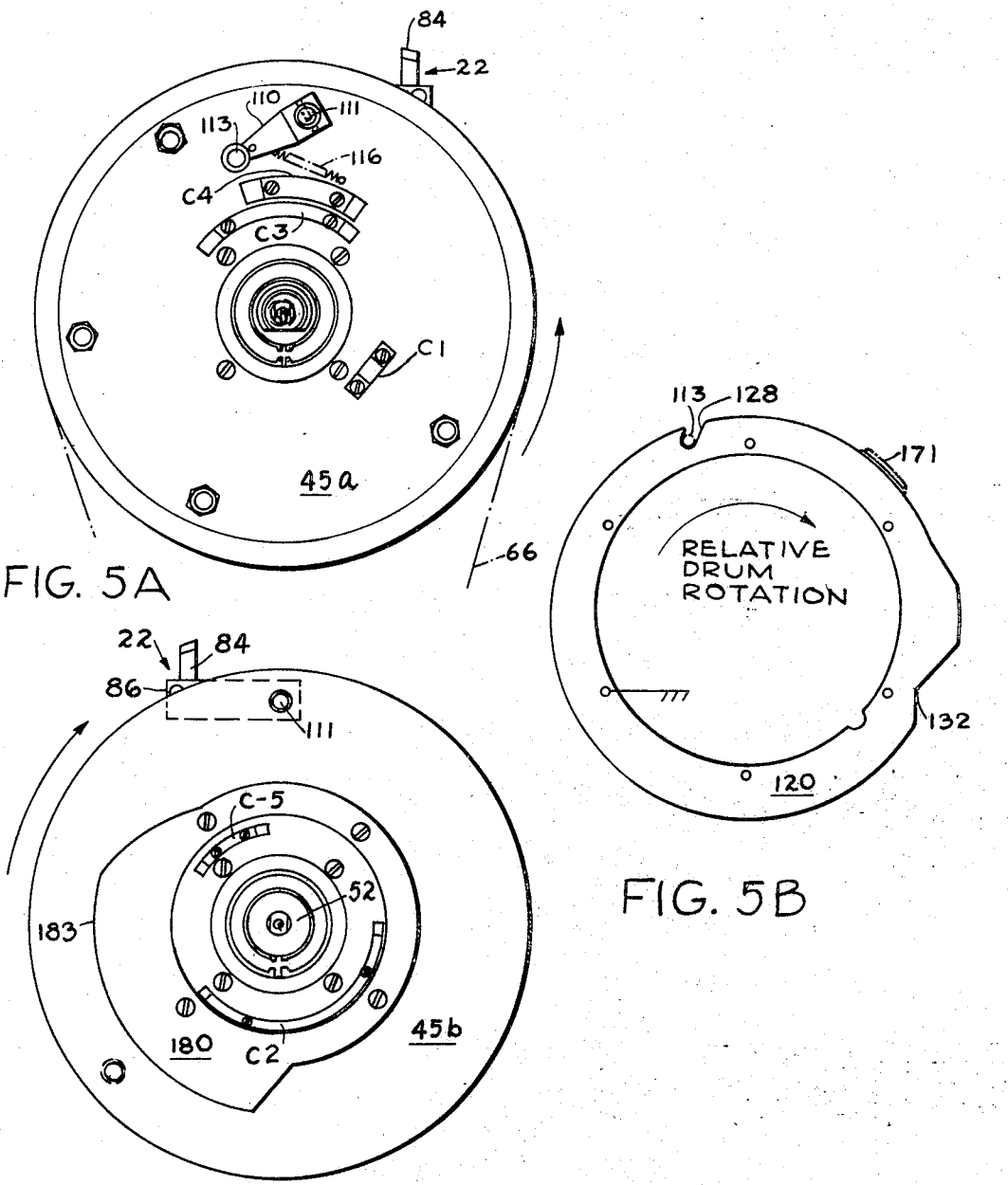

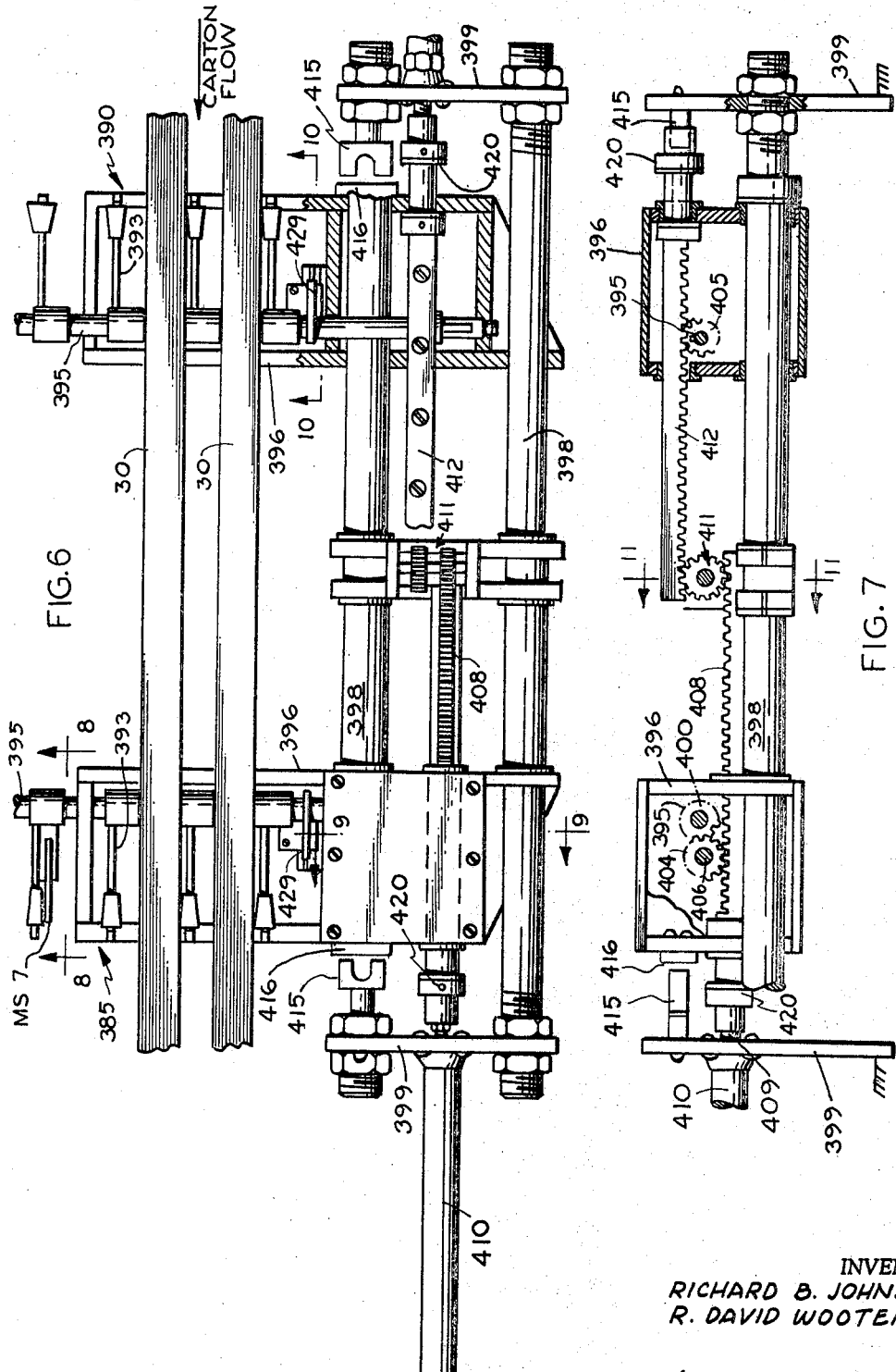

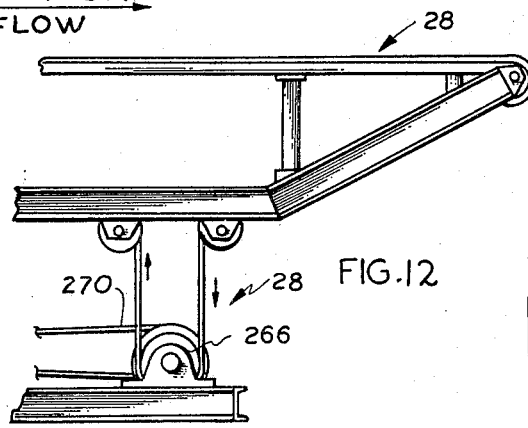
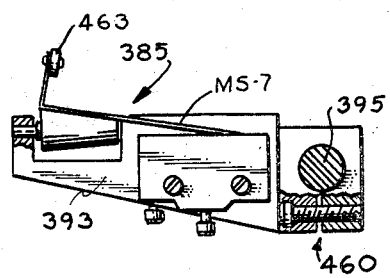
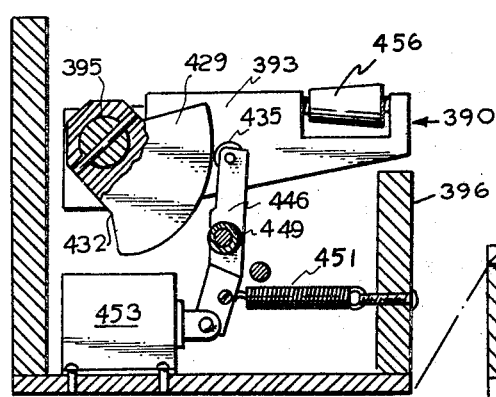
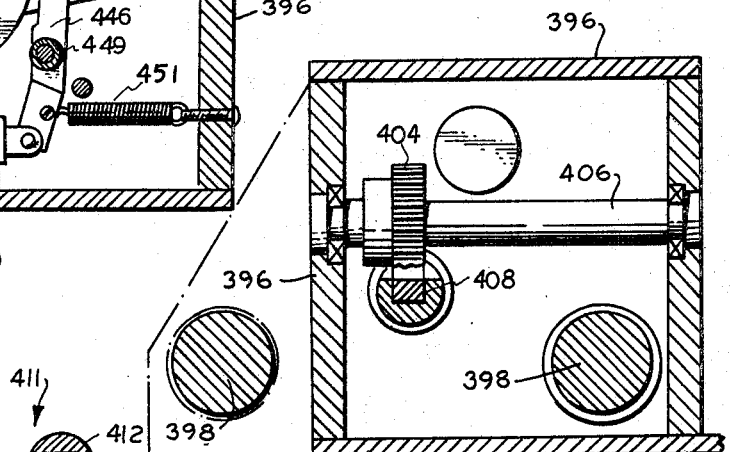
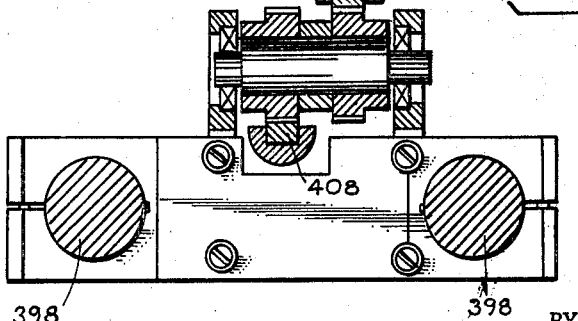

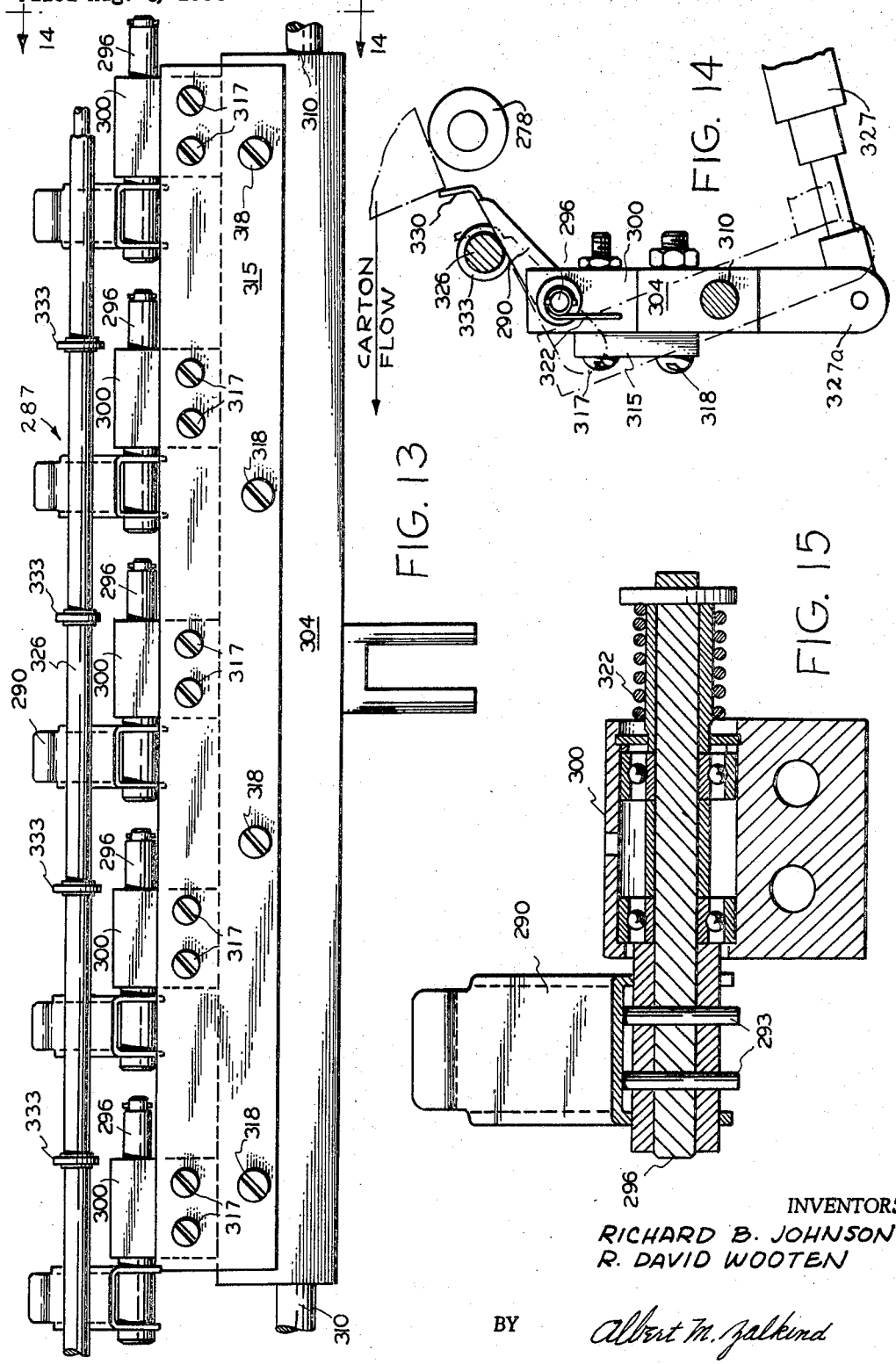

Feb. 17, 1970 R. D. WOOTEN ET AL 3,496,048
CARTON LABELING MACHINE
Filed Aug. 4, 1964 20 Sheets-Sheet 13
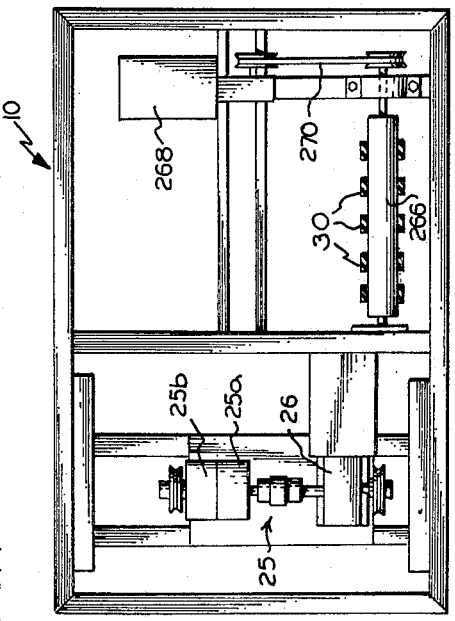
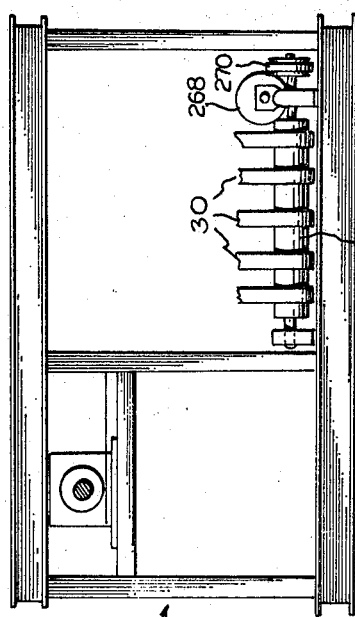
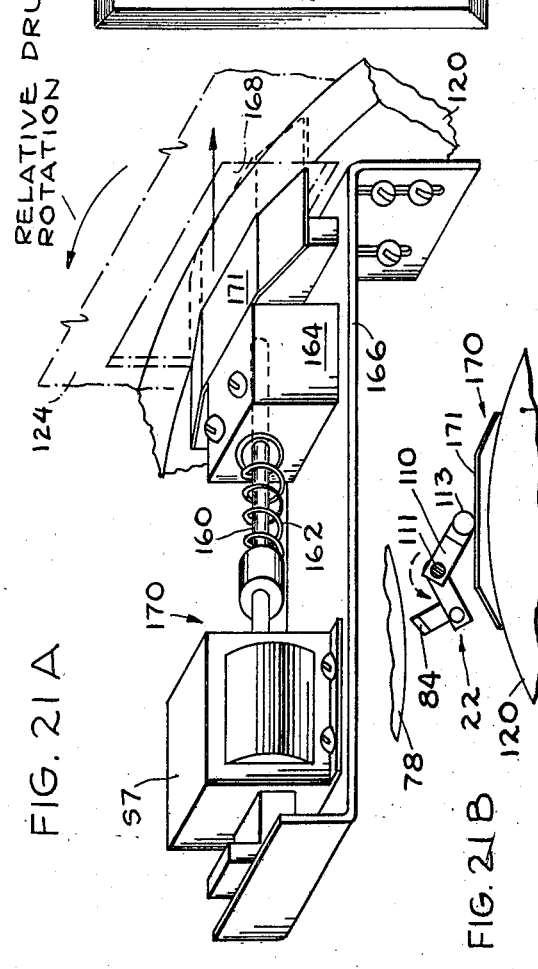
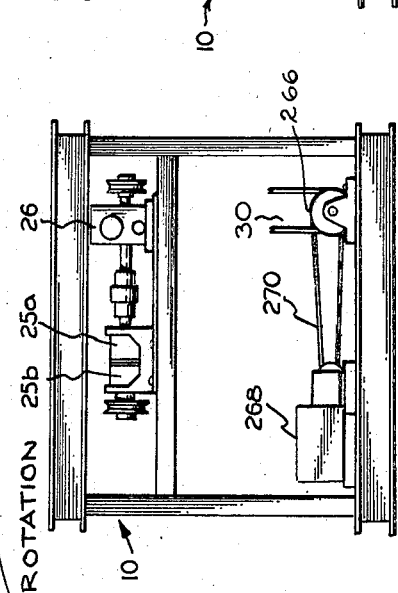
INVENTORS
RICHARD B. JOHNSON
R. DAVID WOOTEN
BY
Albert M. Galkind
ATTORNEY

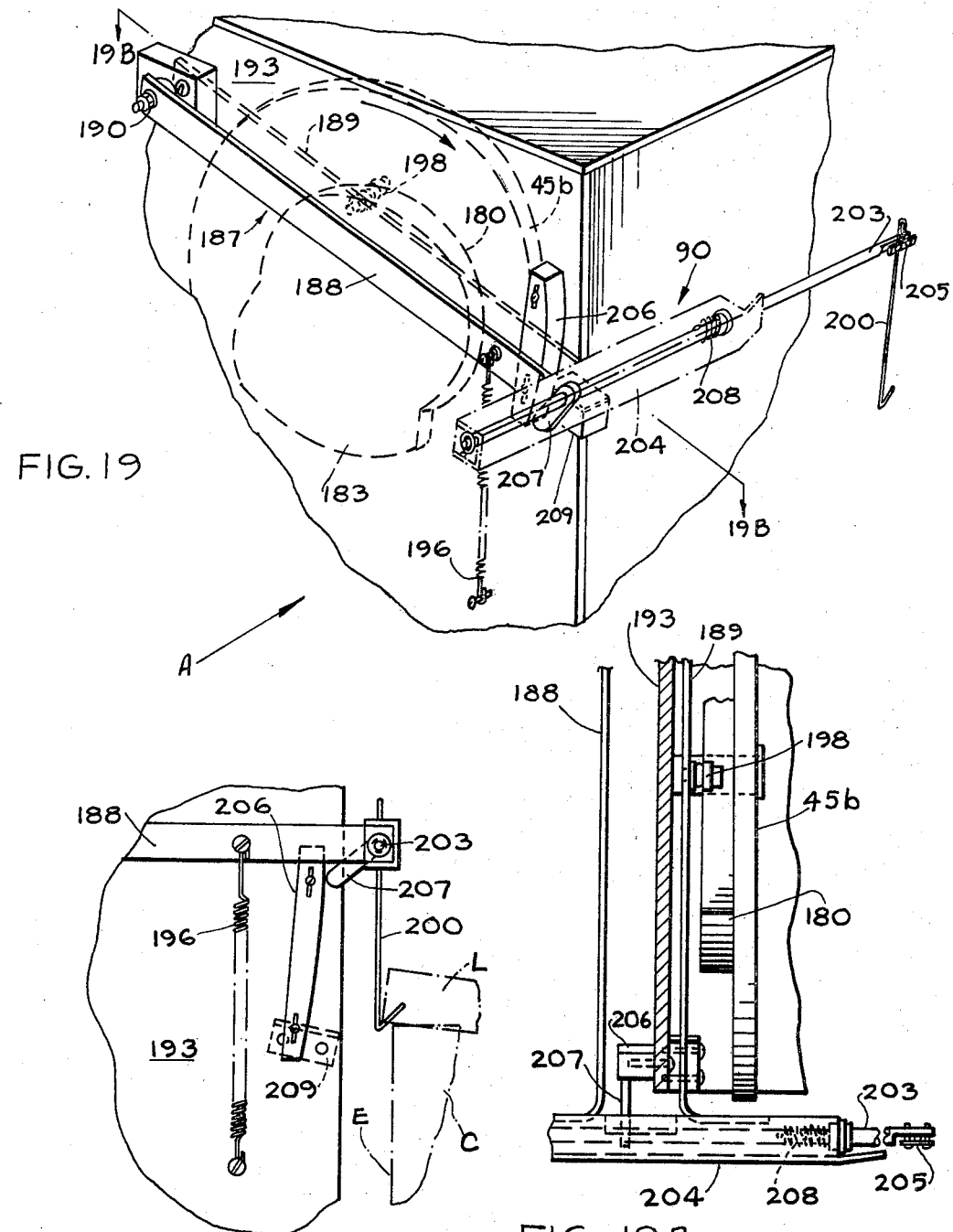

INVENTORS
RICHARD B. JOHNSON
R. DAVID WOOTEN

BY Albert M Zalkind

ATTORNEY

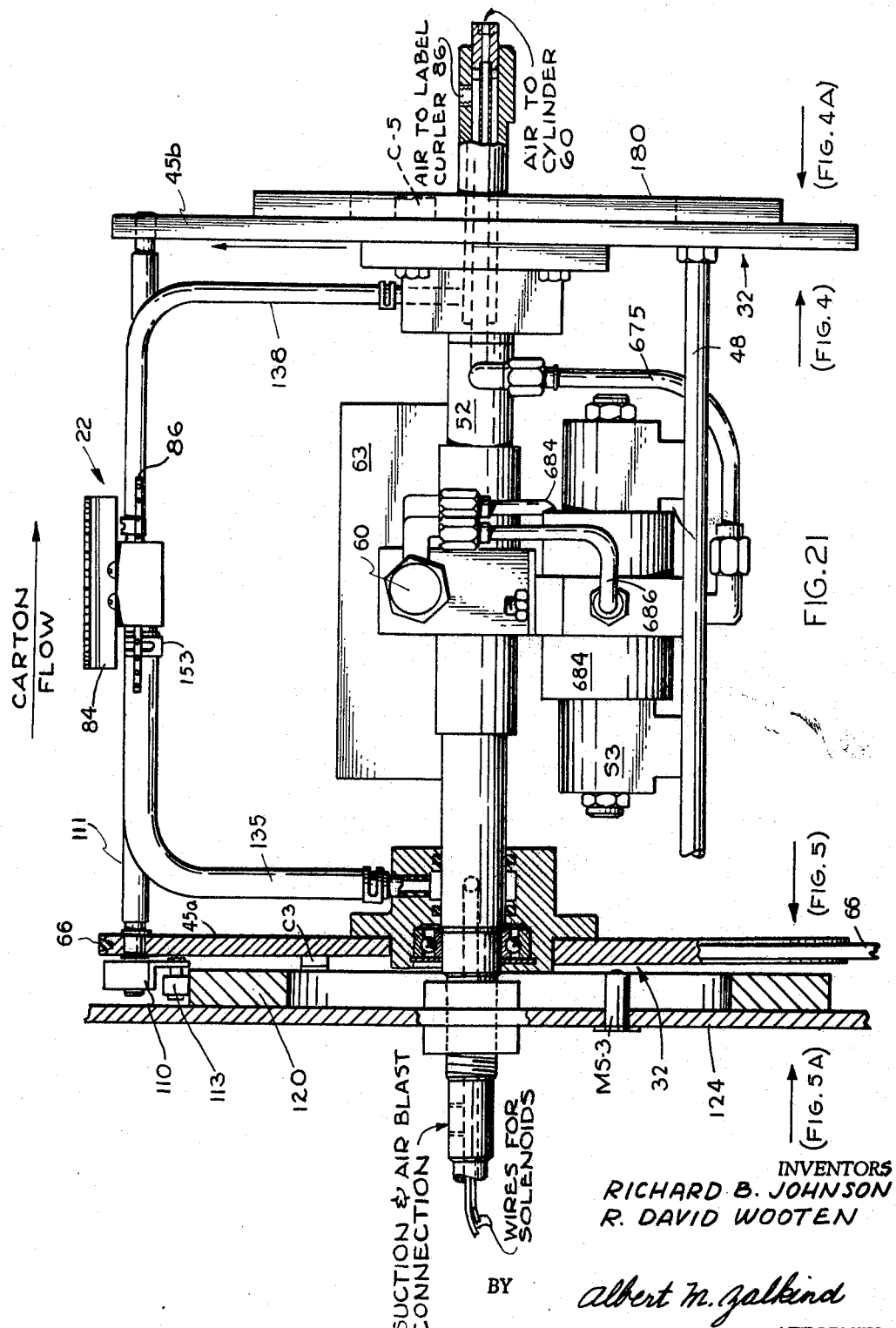

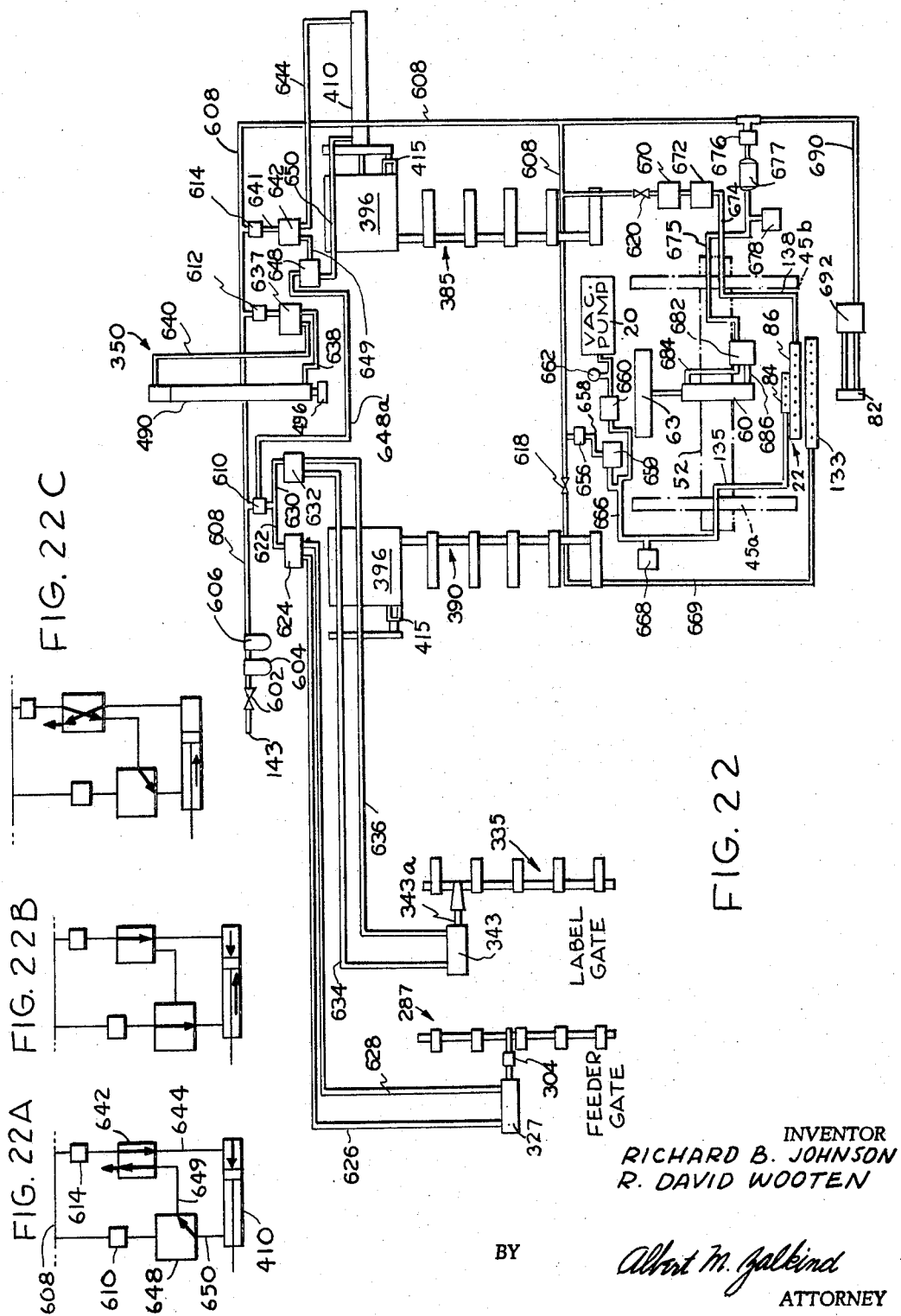

INVENTORS
RICHARD B. JOHNSON
R. DAVID WOOTEN

INVENTORS
RICHARD B. JOHNSON
R. DAVID WOOTEN

BY Albert M. Galkind
ATTORNEY

United States Patent Office 3,496,048
Patented Feb. 17, 1970

3,496,048
CARTON LABELING MACHINE
Robert David Wooten, Rockville, and Richard B. Johnson, North Linthicum, Md., assignors to Aerojet-General Corporation, El Monte, Calif.
Filed Aug. 4, 1964, Ser. No. 387,433
Int. Cl. B65c 9/14, 9/02
U.S. Cl. 156—363
38 Claims

ABSTRACT OF THE DISCLOSURE

The construction contemplates a mechanism which feeds covered cartons to a rotary drum and wherein one end of the cover on each carton in turn is raised to expose an end of the carton. Thereupon a label is applied to that end of the carton. The rotation of the drum serves to pick up individual labels from a magazine and to apply adhesive thereto, subsequently applying each label to a carton as it moves into position relative to the drum. The action of the drum is synchronized with actuating and clamping mechanism as well as cover-lifting mechanism, all of which is operative on cartons, so that a fully automatic machine is achieved.

---

The invention relates to a machine for applying labels to cartons or containers constructed of cardboard, plastic, wood, metal or the like, and, more particularly, to a machine for applying a label to a carton or box having a lid.

Prior art machines are well known, in which labels are taken from a magazine and adhesively coated for subsequent applying to cartons and boxes of various kinds. However, a problem exists where the label is to be applied to a carton having a telescopic cover with a depending margin which interferes with the side or end area to which the label is to be applied. Thus it becomes necessary to remove the cover during the labeling operation and then to replace the cover, a slow and costly process inasmuch as it is carried out manually.

The invention solves this problem by providing for automatically raising one end of the cover in order to expose the complete labeling area of the carton. No manual effort is required and the machine processes the cartons with their covers already in place. In fact, the cartons have already been packed with merchandise that they are intended to house, for example, shoes.

Accordingly, it is a primary object of the invention to provide an automatic machine capable of labeling the lid covered cartons.

Another object of the invention is to provide a machine wherein labels are carried in an interchangeable magazine so that different types of labels and different sizes of labels may be applied in the same machine with a minimum of operator effort and with no adjustments of the machine being required.

A further object of the invention is to provide a machine of considerable versatility in that any size of a wide variety of cartons may be processed for a label without any need for effecting adjustments of the machine.

A still further object of the invention is to provide a machine wherein cartons of mixed sizes may be fed successively to the labeling mechanism without requiring any adjustment of the machine nor any special care on the part of the operator.

A further object of the invention is to provide a machine wherein the labels may be applied to any desired side of a box by merely orienting the box through the feeding mechanism, without any adjustment or special care being required.

It will be apparent from the above objects that the invention provides a machine having a minimum of downtime and it may be operated by relatively unskilled personnel.

Briefly, the machine comprises a housing and frame built of channel irons and side plates and having a lower frame and an upper frame, the construction being such that a carrier or conveyor comprising a plurality of continuously moving spaced and parallel belts, is supported by the lower frame to carry the cartons past a labeling mechanism built into the upper frame. Cartons are fed individually under control of automatic gating mechanisms in conjunction with an upstream roller bank to hold each carton in turn from moving to the labeling mechanism while a downstream carton is having a label applied thereto. As each carton moves into position in front of a rotary labeling drum, a series of clamping finger grips are responsive to a photo-electric control. Such clamping fingers are in two sets interdigitated with the belts and therebelow, and move upwardly between the belts and toward each other, clamping the carton and holding it stationary in front of the labeling applying drum, thus automatically centering the carton to take a label on the side facing the drum. Simultaneously with the movement of the clamping fingers, a pneumatically operated positioning pad is actuated to push the carton toward the labeling drum into position against a stop to receive the label. When the clamping fingers and the positioning pad have thus positioned the carton it is in a precise position and securely held; at this time a hook-like, lid lifting element is motivated which catches below the edge of the depending lid of the cover. The effect is to lift that end of the cover which marginally conceals the end area of the carton to which the label is to be applied, fully exposing such area, whence the label is then applied.

The label applying drum carries a pneumatic label applying holder or nozzle head which picks up labels by suction one at a time from a relatively stationary label magazine, such that the magazine moves up away from the suction head just prior to the time the suction head starts its rotary motion with a label, moves the label past a gluing device and then into position against the carton end to which it is to be applied and initially applies it by air blast. A sponge rubber pressure pad is then actuated to press the label against the box end.

The lid lifter is synchronized with the drum rotation so as to lift the lid during the course of action of the drum and retain it in lifted position while the nozzle head and the sponge rubber pad are acting.

Thereafter, the clamp fingers are withdrawn along with the positioning pad, the carton lid is replaced automatically and the continuous movement of the belts carry the carton away to the end of the machine.

A detailed description now follows in conjunction with the appended drawing in which:

FIG. 1 is a front elevation view of the machine of the present invention from the operator's side with panels removed showing the front of the rotary central labeling drum, gates, conveyor, vacuum pump and other components;

FIG. 1A is a perspective view of the opposite side of the machine;

FIG. 1B is an elevation partially in section showing the relationship of the label carrier and glue roller;

3

Figure 2A:
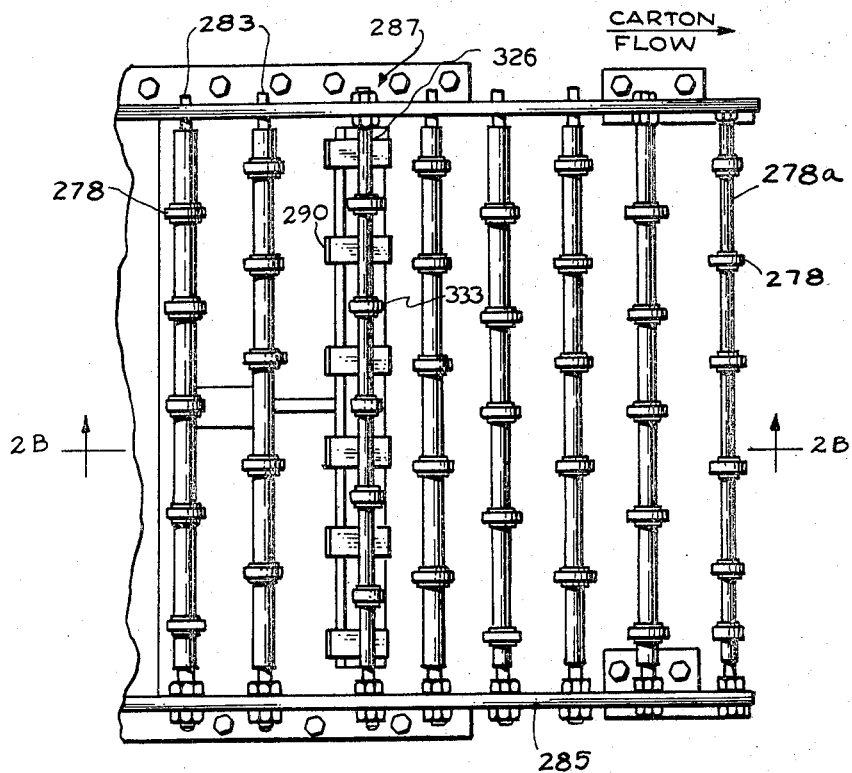
FIG. 2A is a fragmental plan view of a roller bed taken substantially on lines 2A—2A of FIG. 1.
Figure 2B:
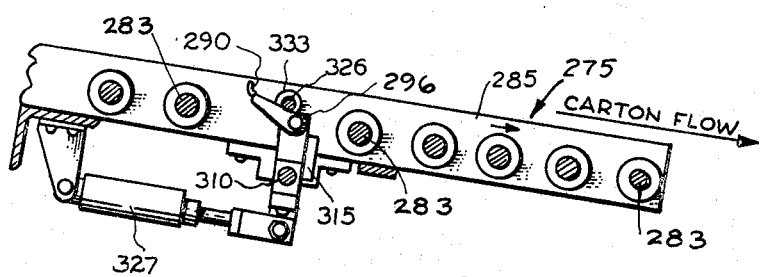
FIG. 2B is a longitudinal cross-sectional view of FIG. 2A, taken on lines 2B—2B of FIG. 2A.
Figure 2D:
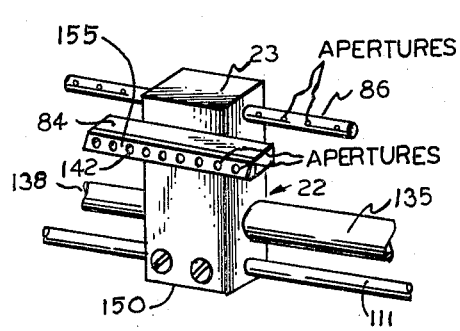
FIG. 2 is a plan view of the machine showing the labeling unit, belt conveyor, carton positioning means and other components.
FIG. 2C is a partial cross-sectional view of a shaft of the roller bed showing freely rotative discs on which cartons roll toward the machine.
Figure 3C:
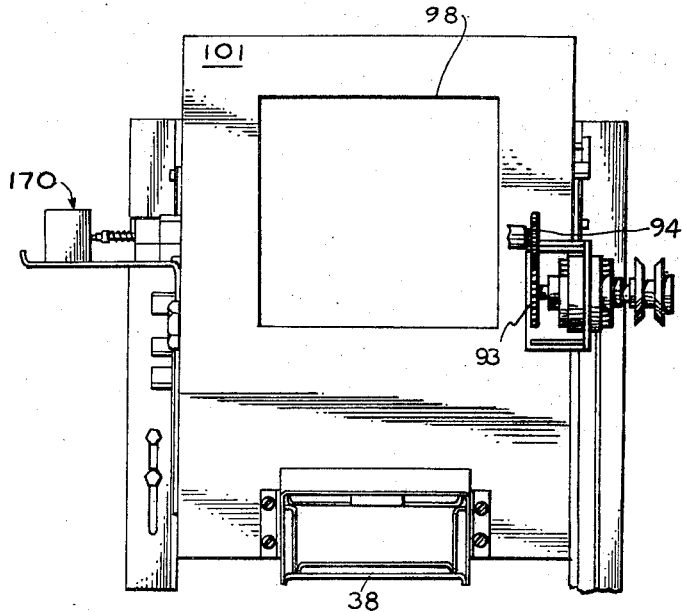
Figure 3D:
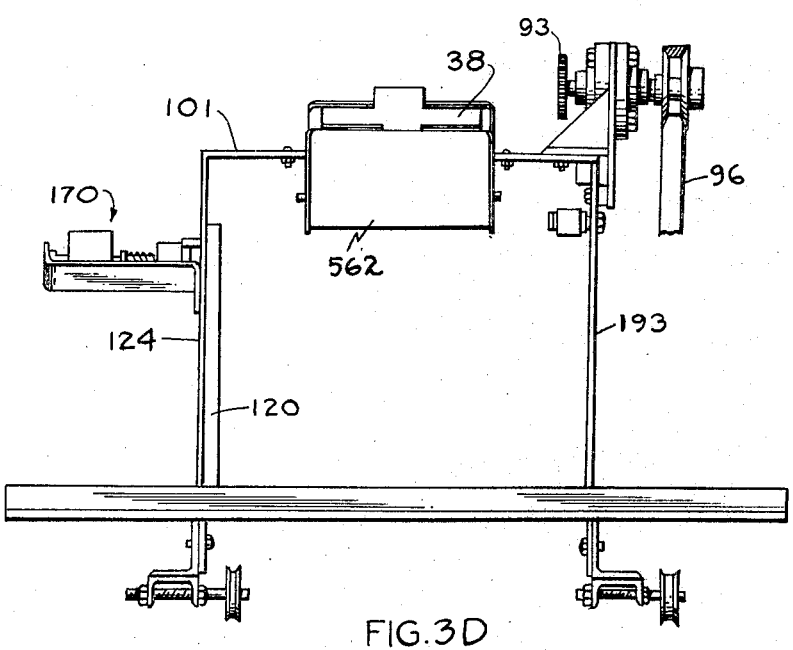
Figure 4:
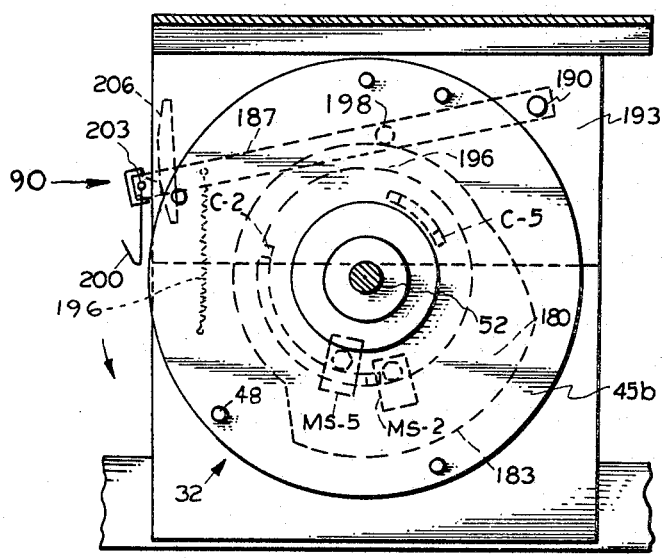
Figure 5:
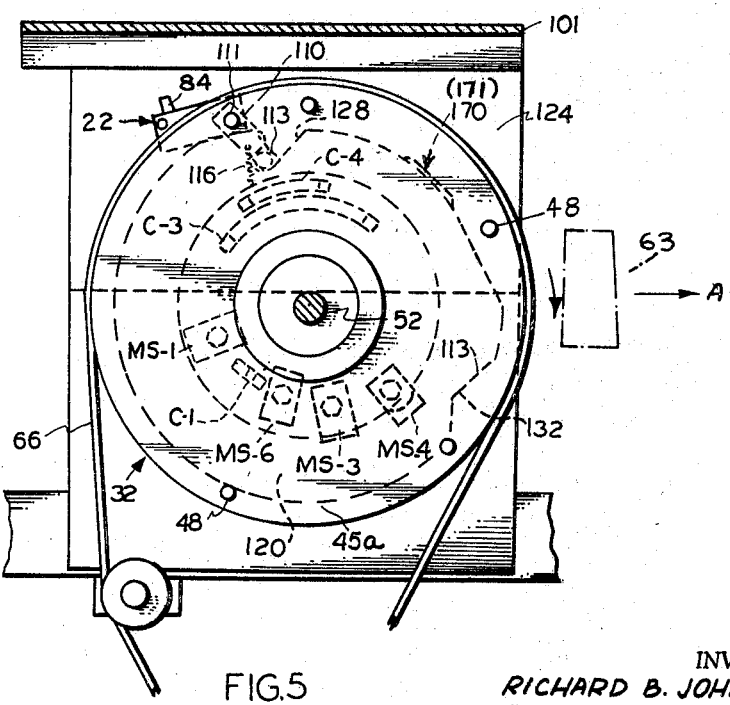
Figure 20:
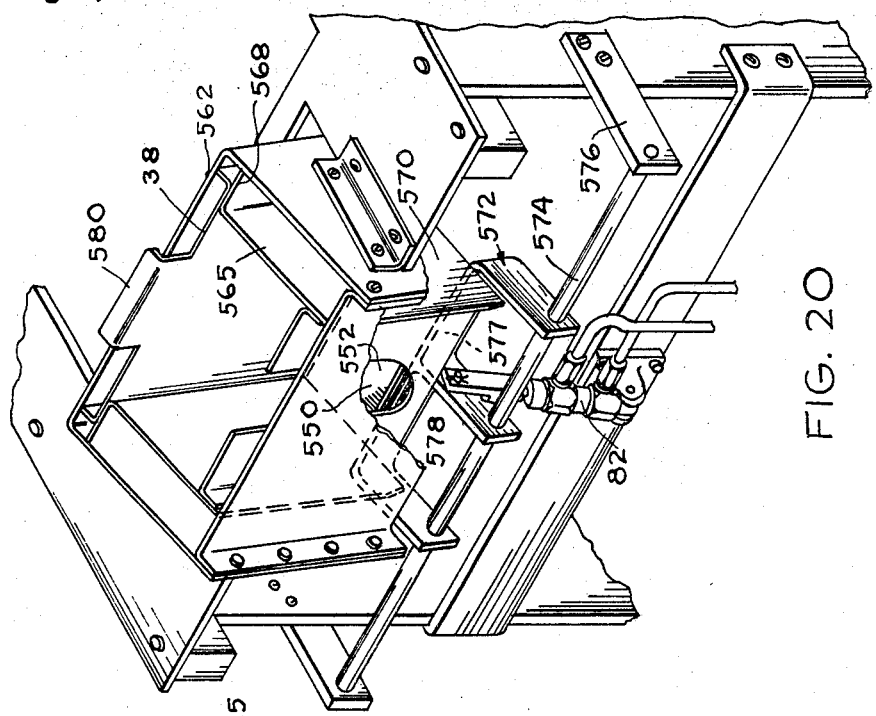
Figure 20A:
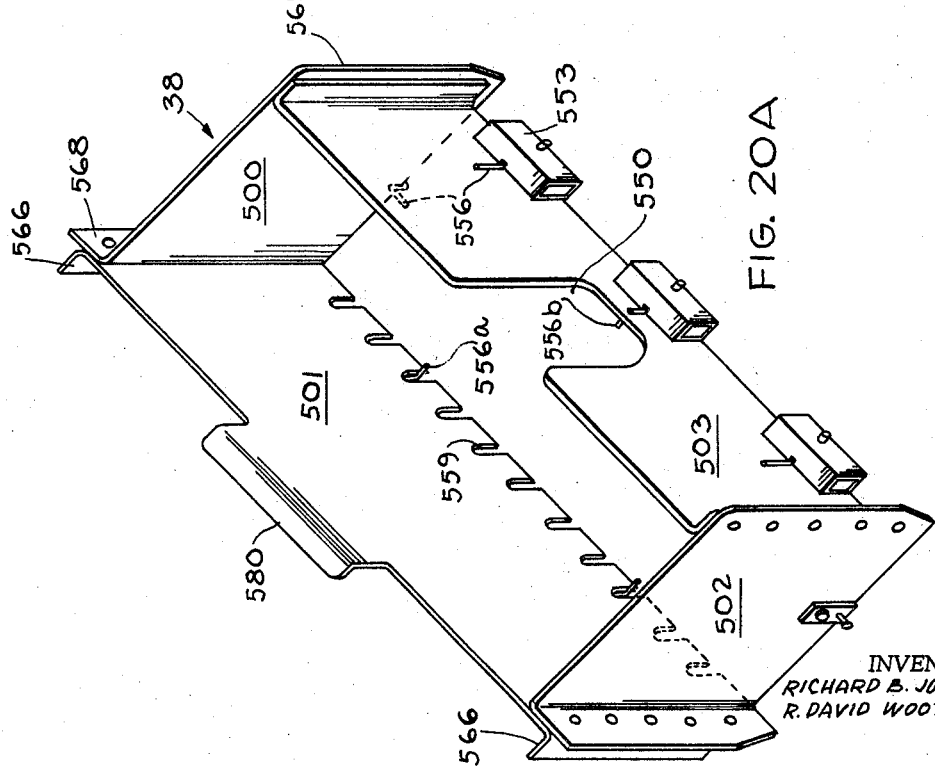

FIG. 2D is a perspective view of the label carrier of the invention;

FIGS. 2E, F, G and H illustrate the coaction of the suction nozzle and magazine;

FIG. 3 is a section through 3—3 of FIG. 1 in the direction of the arrows;

FIG. 3A is a perspective view of the soft pressure pad, actuating air cylinder and solenoid valve carried on a central shaft of the labeling drum, all of which cooperate to press a label against a juxtaposed carton held between the clamping fingers;

FIG. 3B is a bottom perspective view of the glue container in association with the glue drum and picker fingers;

FIG. 3C is a plan view of the upper frame of the machine showing details of the glue roller drive and the position of the label magazine;

FIG. 3D is an end view of FIG. 3C;

FIG. 3E is a detail in section of the glue pan support;

FIG. 3F is a detail of the glue roller;

FIG. 4 is a sectional elevation view taken on lines 4—4 of FIG. 1 showing control cams and microswitches and the lid lifter cam on the downstream drum flange;

FIG. 4A is a view similar to FIG. 4 but taken from the opposite side of the drum flange, looking upstream;

FIG. 5 is a sectional elevation view looking upstream taken substantially on lines 5—5 of FIG. 1 showing additional cams and microswitches on the upstream drum flange and a fixed detent cam for holding the drum stationary;

FIG. 5A is a view similar to FIG. 5, but taken from the opposite side looking downstream;

FIG. 5B is an elevation of the detent cam;

FIG. 6 is a plan view of the clamp mechanism which holds the carton in position while it is being labeled;

FIG. 7 is an elevation view showing a portion of the clamp actuation mechanism;

FIG. 8 is a sectional view in elevation taken on line through 8—8 of FIG. 6;

FIG. 9 is a sectional elevation on line 9—9 of FIG. 6;

FIG. 10 is a sectional elevation on line 10—10 of FIG. 6;

FIG. 11 is a sectional elevation on line 11—11 of FIG. 7;

FIG. 12 is a fragmentary elevation of the motorized end of the conveyor;

FIG. 13 is an elevational view of the initial feed roller bed showing the carton separator feed gates upstream of the labeling mechanism;

FIG. 14 is a view in elevation taken on line 14—14 of FIG. 13;

FIG. 15 is an enlarged view partially in section of one of the individual carton control feed fingers;

FIG. 16 is a plan view taken generally on the line 16—16 of FIG. 1 showing the motors and electrical clutch and brake devices which operate the machine;

FIG. 17 is an elevational view of FIG. 16;

FIG. 18 is an end view of FIG. 16;

FIG. 19 is a perspective of the lid lifter mechanism;

FIG. 19A is a side view in the direction of arrow A;

FIG. 19B is a plan section on line 19B of FIG. 19;

FIG. 20 is a perspective of the magazine and actuating mechanism;

FIG. 20A is a perspective of the magazine per se;

FIG. 21 is an elevation showing the essential components of the label pickup drum;

FIG. 21A is a fragmentary perspective of an auxiliary cam mechanism which prevents the label pick-up nozzle head from contacting the glue roller when there is no label being carried by the nozzle head;

FIG. 21B shows a detail in elevation, fragmentarily, of certain of the components of FIG. 21A;

FIG. 22 is a schematic layout of the pneumatic circuitry of the machine;

4

Figure 23:
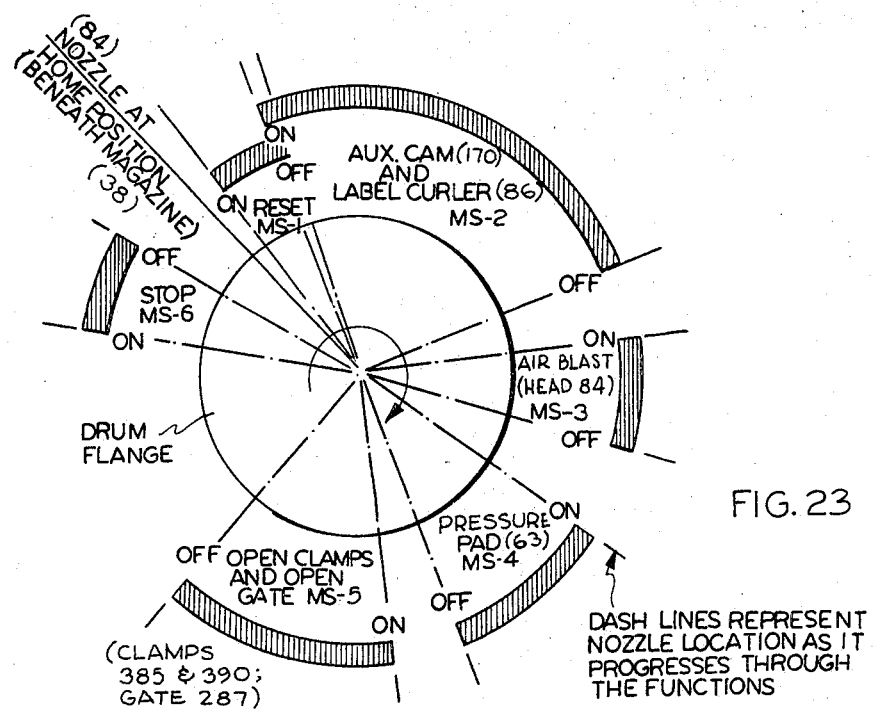
Figure 26:
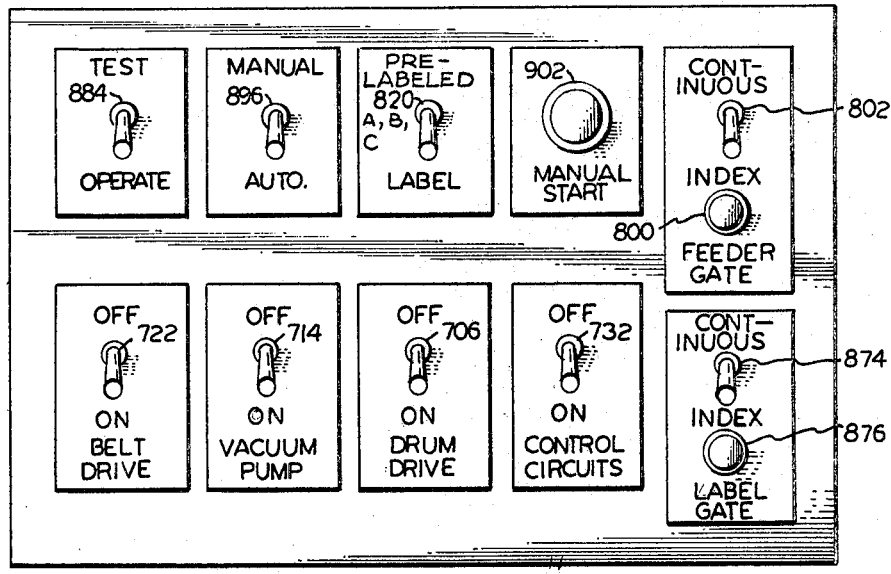
Figure 24:
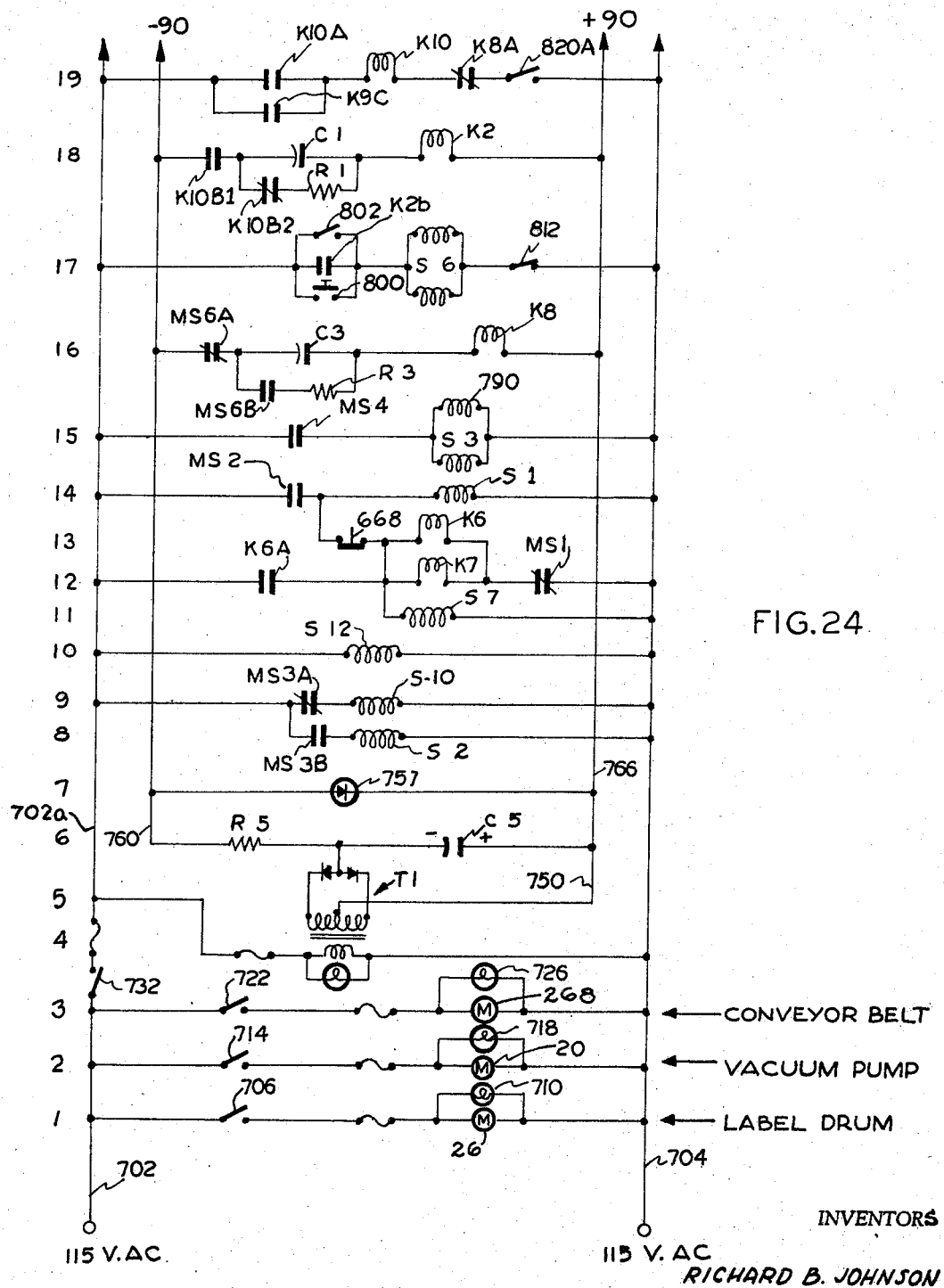
Figure 25:
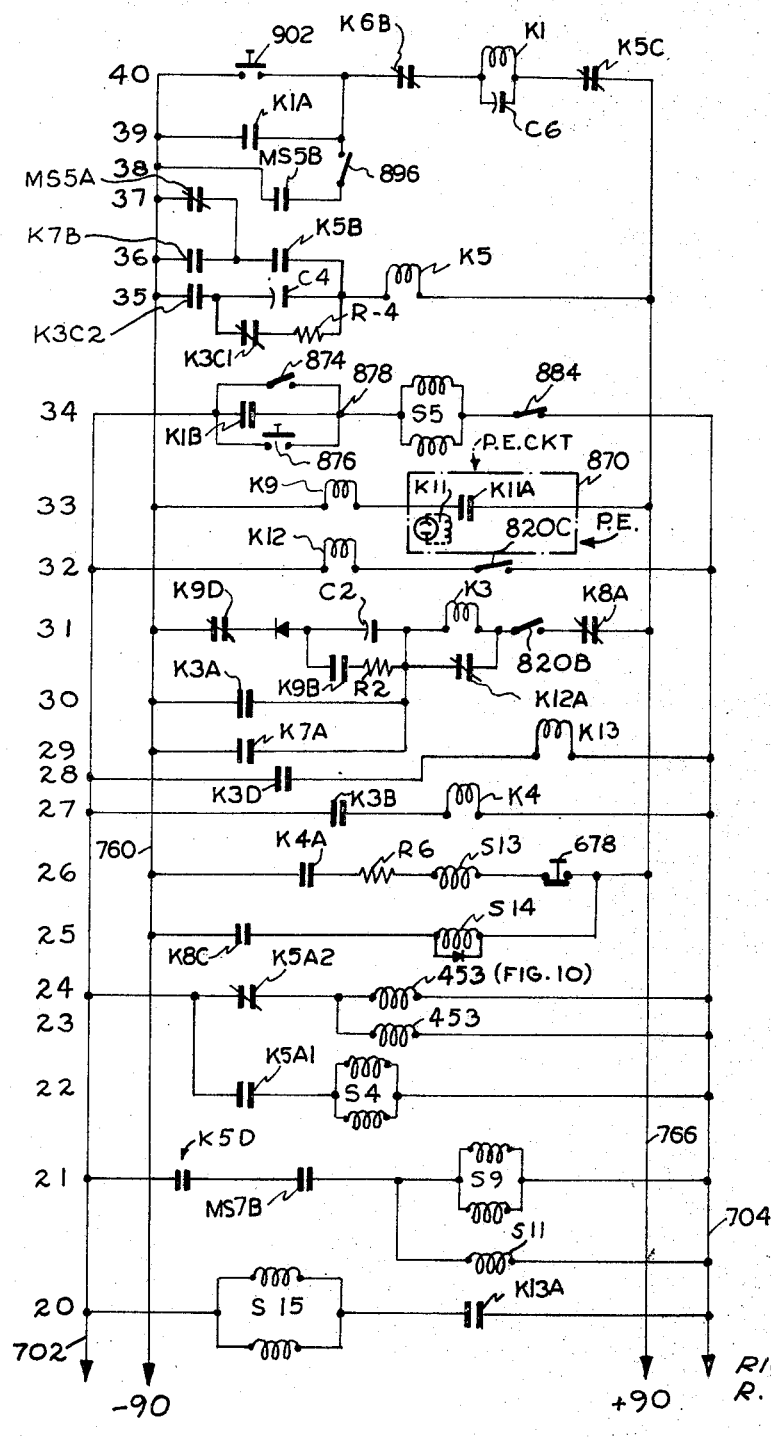

FIGS. 22A, B, C show valve positions for clamp control;

FIG. 23 is a cyclic timing diagram describing the functions involved when one complete rotation of the labeling drum closes and opens switches with cam action;

FIGS. 24 and 25 show the wiring diagram for the control of the machine and power circuits of the motors therein; and FIG. 26 is a view of the operating panel of the machine.

GENERAL DESCRIPTION

As seen in FIGS. 1, 2 and 3, the invention comprises a lower frame 10 constructed in any conventional manner of angle iron and channels superimposed on which is an upper frame 15. The lower frame 10 supports various components, for example, a vacuum pump 20 which effects suction for the label carrier head 22, FIG. 2D, and also a motor combination 25, and clutch-brake 25a, 25b driven by motor drive 26 which operates the continuously moving feed belt conveyor 28 comprised of a plurality of spaced and parallel belts 30 operating in unison and supported on rails 31, FIGS. 1, 1A and 3.

A rotary labeling drum 32 is likewise supported on frame 10 and picks labels from a magazine 38, FIGS. 2E–2H, 3D, 20, 20A, by means of head 22, FIGS. 3 and 21, carried by drum 32. Magazine holder 562 can accommodate interchangeable label magazine 38 so that different label sizes may be used.

As best seen on FIG. 1A, devices designated as "CLAMP" are interdigitated with belts 30, coming up therebetween to hold each carton in turn fixed in front of drum 32 to reecive a label, while the belts slide below the stationary carton.

The labeling drum 32 is comprised of a pair of parallel side flanges or discs 45a, upstream, and 45b, downstream, oppositely spaced by means of rods 48 spaced primarily on one side of the drum there being a wide gap between rods at the other side of the drum. The flanges are mounted on a hollow fixed shaft 52 carried in side frame plates (124, FIG. 21, one shown) secured by angle iron means 57, FIG. 1, to the top of lower frame 10. Secured within the drum is a pneumatic cylinder 60, FIGS. 3, 3A, 21, having a piston rod 60a carrying a soft rubber pressure pad 63, which can reciprocate in the arrow direction, FIG. 3, to press a label against the end E of a carton C. The wide gap between rods 48 at one side is then in front of pad 63 to permit it to emerge from the drum.

The drum 32 is rotated by a belt 66 in a groove, FIGS. 3 and 21, around disc 45a, powered by the motor 26, as shown in FIG. 1. Tension in the belt 66 is effected by a conventional tensioning pulley 70, as shown in FIG. 3, details being omitted.

Located above the drum 32 is a glue device 75, FIGS. 2, 3 and 3B, for applying wet glue therein to labels as they are carried below a glue roller 78 by the label carrier 22, FIG. 1B.

The magazine 38, FIGS. 2F–2H, 3, 20, 20A, holds a quantity of labels, the bottommost one being exposed, FIG. 2E, and as the label carrier 22 reaches the magazine 38 it contact the bottommost label and its motion momentarily ceases as the drum 32 stops. At this time a pneumatic cylinder 82, FIGS. 1, 3, 20, lifts the label magazine 38, thereby leaving a single label adhering by suction to the perforated manifold nozzle head 84, a part of carrier 22.

The drum 32 then renews rotation and the label on the nozzle head 84 is wiped past glue roller 78, and an air blast from perforated compressed air manifold nozzle tube 86 serves to curl the label against the roller 78 to insure thorough coating, FIG. 1B. Further rotation of drum 32 brings the label on the nozzle head 84 to align with the end E of carton C from which, at this time, the lid L of the carton has been raised, FIGS. 3 and 19A, to the position shown in dotted lines, by a cam operated lid lifter mechanism 90, FIG. 19. The drum 32 continues to rotate while the head 84, rotating therewith, moves past the carton end and the label is applied thereto with the drum never ceasing rotation during application, the glue coated surface of the label being partially applied by nozzle head 84 as it brushes past end E.

Thus, suction in head 84 is cut off and a blast of air passed therethrough to blow the adhesively coated label against the carton end E. A practical clearance between the nozzle head 84 and the adjacent end E of carton C at the time of label application has been found to be about the thickness of the label, so that there is very little clearance therebetween. The air blast through the head 84 causes the label to initially and firmly adhere to the carton end.

After the nozzle head has cleared the carton end pad 63 moves against the label effected by air pressure in cylinder 60 to apply suitable pressure to the label for effecting permanent adhering. The drum 32 continues its rotation while pad pressure is applied.

It will be noted from FIGS. 3, 3A, and 5 that the pressure pad is thicker at the bottom than at the top so that it presents a slanted surface which effects greater pressure at the bottom of the label than at the top of the label. This is expedient to compensate for the tendency of labels to curl away from the carton at their bottom edges after being initially applied by the nozzle head 84. It will, of course, be understood that in instances where the curling away may occur at the upper portions of the label, depending upon label size and material, the pad surface may be slanted in the reverse direction.

The pad itself may be of any suitable foam rubber or plastic material and preferably has a smooth, flexible, thin sheet of rubber or plastic cemented to the surface which contacts the label.

The lid lifter 90 drops to the solid line position, FIG. 3, replacing the carton lid L to the solid line position, and the labeled carton is then carried off on the belt 28. At the end of this cycle, the drum stops when the label carrier is once more below magazine 38.

Suitable carton movement control gates and the clamps mentioned above position each carton in turn for label application in register with head 84, gate release and other control being responsive to circuitry controlled by a photoelectric beam indicated as P.E. on FIGS. 1A and 2.

All essential details of components mentioned in this general description will be explained hereinafter.

THE GLUE COATING MECHANISM

Referring to FIG. 3, the glue device 75 will be seen to be mounted over the drum 32 with the bottom portion of roller 78 exposed below the floor 76a of the pan 76 so as to be engaged by labels, as shown in FIG. 1B. Roller 78 is carried on a shaft 91 which rests in open top slots of pillow blocks, such as 92, FIG. 3F, the adjacent walls of pan 76 being slotted to accommodate the shaft ends. The shaft ends may have collars such as 91a, FIG. 3F, bolted to the pan sides for holding the shaft in place, removal of the collars freeing the shaft. Shaft 91 has a gear 93 keyed thereto which meshes with a gear 94, FIGS. 3C and 3D, gear 94 being driven by belt 96 from the shaft of motor drive 25, FIG. 1.

Thus, the roller may be bodily lifted out of the pan for cleaning or replacement, the gears disengaging, and re-engaging when the roller is replaced.

Pan 76 has three angles 97 attached adjacent the bottom, FIGS. 3B and 3E, which are apertured to receive the ends of threaded adjusting pins 97a and is carried over a rectangular cut out 98, FIG. 3C, in top frame plate 101. The pins are threaded in plate 101 and can be rotated to adjust leveling of the pan.

The pan bottom 76a, FIG. 3F, carries a strip 76b to which is bolted a series of sealing fingers 102, which protrude into respective peripheral grooves 103 in the surface of roller 78, with a low clearance, about .002", to minimize glue pickup by the grooves, the edge of the pan bottom adjacent the roller having a larger clearance, about .006" with respect to the roller so that a glue coating is effected on the roller as it rotates.

Below the pan floor, FIG. 3B, showing an upside down view, are a series of picker fingers 105 carried on a bar 107 extending transversely of the pan and braced by passing through a bar 108. Screws 109, FIG. 1B, secure the picker fingers to bar 107.

The picker fingers extend into respective grooves, FIG. 1B, and serve to prevent labels from being carried around the roller, i.e., from being pulled off nozzle head 84 by the adhering effect of the roller. The picker fingers may be of wire or strip material and do not engage any part of the groove walls so that they remain relatively glue free.

Thus, due to the action of sealing fingers 102, dry paths are effected on labels as they pass the roller, and such paths remain relatively dry in passing the picker fingers 105.

It will be understood that the glue roller runs continuously, motor drive 25 having a double shaft, one of which continuously operates the glue roller and the other of which operates the clutch of drum drive.

THE DRUM DRIVE, ASSOCIATED CAMS, MICROSWITCHES, AND LABEL CARRIER SUPPORT

It will be noted that the drum 32 is rotated, FIGS. 3, 4, 5, 21, via belt 66 through the clutch end of the clutch-brake and motor drive 25, so that rotation and stopping of the drum 32 is effected in a manner to be hereinafter described by engagement and disengagement of the clutch. Motor drive 25 is comprised of electrical clutch and brake components 25a and 25b, respectively, and driving motor 26. A particular mechanism involving a cam follower and a notch in a cam, to be now described, insures the drum 32 stopping at an exact position each time it is intended to stop. Thus, considering FIG. 5, the fixed shaft 52, as shown, carries the drum as previously described and the drum flange 45a has externally a lever 110 on a rotative shaft 111, having a roller type cam follower 113, which lever is biased by a spring 116 in a clockwise direction as shown, it being understood that one end of the spring 116 is fixed by any suitable conventional means to the lever 110 and the other end is fixed in any suitable manner to the outside of the disc 45a. A fixed cam 120 is secured to the vertical frame side plate 124 and is provided with notches, such as 128 and 132. Notch 128 effects a stationary drum position at the time the suction head 84 is to pick up a label. Thus, at that time, clutch 25a of FIG. 1 is released, the brake 25b is actuated momentarily to stop rotation of the drum. The brake 25b is then released and the drum is then actually momentarily free on shaft 52.

The drum freedom permits the spring 116, FIG. 5, to pull the roller follower 113 of lever 110 to the bottom of the notch 128 effecting a position detent which disposes the drum exactly as required for the suction head 84 to pick up a label from magazine 38. Thus, exact control of the stopping position of the drum is afforded for label pickup, carrier 22 being below magazine 38, FIG. 3.

Subsequently, the label being picked up, it is carried around in the direction of the arrow shown in FIG. 3 to a position where it is to be applied to a carton. At this time, the roller follower 113 rides into the notch 132, and this positions the label carrier 22 which can rock relative to the drum by virtue of being keyed to shaft 111. This action occurs even though the drum continues to rotate and precisely positions the label carrier 22 for applying the label at the time that the roller 113 is at the bottom of the notch 132, the nozzle holes of head 84 being thus caused to directly face the carton end.

The drum flange 45a (FIGS. 5 and 5A) also carries on its outer face cams C1, C3 and C4 for operating microswitches MS1, MS3, MS4 and MS6 which are carried on side plate 124; the cam C1 operating both MS1 and MS6. Drum flange 45b similarly carries cams C2 and C5 (FIGS. 4 and 4A) for operating microswitches MS2 and MS5 carried on said plate 193. These cams are arcuate segments on the outer surfaces of the flanges as shown in FIGS. 4, 4A, 5 and 5A. The microswitches control machine operation, as hereinafter explained.

The drum also carries a cam 180 for effecting actuation of the lid lifting device 90 to be hereinafter described in detail in conjunction with FIGS. 19, 19A and 19B.

THE LABEL MAGAZINE AND LABEL CARRIER COACTION

Although the arrangement of the label magazine, magazine holder, and magazine actuation will be further described in conjunction with FIGS. 20 and 20A, it is thought desirable at this point to give an explanation of the manner in which the label magazine assists the label carrier in taking away labels.

A magazine holder 562, FIGS. 2E and 20, is provided having an open top and bottom and being essentially a rectangular frame or box in which a magazine 38, FIG. 20A, can be inserted and supported therein on a flange 563, which will be noted to have been bent inwardly at the bottom edge of the holder wall. The magazine is slidably reciprocal in the holder and for effecting lifting of the magazine while a label is being pulled therefrom by nozzle head 84, as explained below, an actuating mechanism comprising the element 572, as indicated by phantom lines, is provided, such element being powered by the pneumatic cylinder 82.

Referring to FIGS. 2E through 2H, there is diagrammatically illustrated, partially in section, the magazine 38 which will be understood to hold a stack of labels the bottommost of which is engageable by nozzle head 84 of label carrier 22. It will be assumed that the label carrier is stationary in FIGS. 2E, F and G, in other words, the rotation of the drum has ceased at this point and suction is being applied to nozzle head 84.

At this time air is blown through a perforated tube 133 fixedly carried in any suitable manner as by a clip or bracket 134 attached to the holder and below the holder so as to blow air through edge slots 559, FIG. 20A, of the magazine against the bottommost labels of the stack. This serves to separate the labels thereby facilitating removal of the bottommost label.

Comparing FIGS. 2F and 2G, it will be noted that there has been relative movement in a generally upward direction of the magazine 38, it being understood that the nozzle head 84 has remained stationary. This serves to pull the bottommost label away since it is adhering by suction to the nozzle head. By further comparison with FIG. 2H, it will be noted that the magazine has now resumed its normal position and the nozzle head has commenced rotation pulling the label along with it.

The timing coaction is such that the magazine is lifted just before the nozzle head starts to move, thus the label is pulled below the forward support elements 556a and away from the stack, the magazine then coming back to rest position on flange 563.

THE LABEL CARRIER AND MODE OF LABEL APPLICATION

The label carrier 22 (FIGS. 1A, 1B, 2C, 3, 21) is carried on the bar 11) which has rotative bearings in the discs 45a and 45b (FIG. 21) which comprise the drum 32 and, accordingly, rotates with the drum. Suitable plastic tubing, such as vacuum tube 135 and air pressure tube 138, FIG. 21, are connected by conventional rotary seals and tubing to the vacuum pump 20 and a pressure line combination, respectively, for feed to the nozzle openings 142 of nozzle head 84 (FIG. 2D) to which compressed air or suction may be fed. Thus, lines from the vacuum pump 20 of FIG. 1 and compressed air line 143 (FIG. 22) connect through valving to the respective ends of tubular drum shaft 52. Shaft 52 is hollow-ended, as shown, so that the tubes can provide suction or pressure by way of valve control to be hereinafter explained in connection with FIG. 22.

The carrier 22 (FIG. 1B) may consist of a solid block suitably channeled for flow from the tubes to nozzle heads 84 and 86, the latter as previously mentioned being effective to ensure contact of the label carried on head 84 against glue roller 78.

The head can be secured to shaft 111 at the split end 150 as by bolts in a conventional manner, the tubing 135, 138 having clamps, such as 153. Nozzle head 84 is slanted to conform to the plane of the labels as it moves against the bottommost label (FIG. 2E) and may have a soft rubber facing 155, FIG. 2D.

In the event that, for some reason or another, the head 84 does not pick up a label, it is not desirable to have it contact the glue roller 78. For the purpose of preventing this, an auxiliary cam device 170 (FIG. 5) is actuated to move into the path of the cam roller 113 to engage the roller 113 thus rocking the lever 110, effecting movement of the head 84 away from the glue roller as it moves thereby. The details of this mechanism are shown in FIGS. 21A and 21B, later explained.

When nozzle head 84 of label carrier 22 is in exact alignment with a carton end and the label thereon is engaged therewith for a portion of its area, an air blast through head 84 breaks the suction and blows the label into further adherence, although not yet complete adherence, which is the function of pressure pad 63 (FIGS. 3, 3A, 5, 21). As noted on FIG. 5, a wide space between shaft 111 and the lowermost rod 48 provides the time required for pad 63 to move beyond the confines of drum 32 and retract therein even though the drum does not stop rotating while carrier 22 and pad 63 are performing their functions. The rotational speed of the drum is substantially constant, the label carrier 22 being independently rocked to align with carton ends under control of notch 132 in cam 120 yet continuing to rotate with the drum, stopping only for picking up a label from magazine 38 and being held precisely for that purpose by cam notch 128 acting on roller 113, as hereinbefore mentioned.

THE AUXILIARY CAM TO PREVENT CONTACT BETWEEN LABEL HANDLING HEAD AND GLUE ROLLER

Referring to FIGS. 1, 2, 5, 21A and B, an auxiliary cam mechanism 170 is provided for the purpose of preventing the nozzle head 84 from coming into contact with the glue roller 78 in the event that there is no label being carried by the nozzle head. Thus, the device prevents fouling of the nozzle head with glue.

As is explained under the circuitry operation portion of this application, a vacuum switch 668 (FIGS. 22 and 24, line 13) is operative to energize a solenoid S-7 (FIG. 24, line 11) to achieve the intended purpose of the auxiliary cam mechanism.

Thus referring to FIG. 21A, the solenoid S-7 is shown which actuates a plunger 160 spring biased by a spring 162 toward the solenoid, which plunger has slidable support in a stationary block 164 carried on a bracket 166 which will be understood to be suitably secured, as by bolts shown, to the (hereinbefore described) sidewall 124, indicated by phantom lines in FIG. 21A. The sidewall has a cutout 168 through which can pass an auxiliary and reciprocal cam 171 having a generally flat top and sloping sides, FIG. 21B. The cam is carried on the plunger 160 so that when the solenoid is energized the cam moves to the dotted position shown directly over the stationary cam 120 which cam governs the rocking of label carrier 22 and, thus, the nozzle head 84, for purposes explained elsewhere in this application.

By superimposing the auxiliary cam 171 over cam 120, it will be noted that the roller 113 is cammed upwardly (FIG. 21B) whence nozzle head 84 is cammed downwardly away from glue roller 78, it being recalled that the lever 110 as well as the label carrier 22 are keyed to the rockable shaft 111 which is carried in the drum flanges 45a and b, all as heretofore described. Accordingly, the effect of cam 171 is to position the nozzle head a sufficient distance from the glue roller to make certain that there will be no engagement therebetween, which engagement might cause glue to clog the perforations of the nozzle head.

The position of cam 171 with respect to detent notch 128 is as shown on FIG. 5, the label carrier 22 being shown in label pickup position. It will thus be understood that the carrier moves around to the position of cam 171 and is thus approaching glue roller 78 at the time cam 171 becomes operative should there be no label on the carrier.

THE LID LIFTER

The lid lifter mechanism 90 of FIGS. 1A, 3, 4, 19, 19B, and C comprises a cam 180 carried by the disc 45b having dwell 183 (FIGS. 4 and 19A) which actuates a rocker arm 187 comprised of two parallel bars 188 and 189 to form the composite integral arm 187 which is pivoted at one end by pin 190 to the side plate 193 of the upper frame. The tension of a spring 196 engages a cam follower 198 carried on the inner bar 189 with cam 180. The arm 187 carries at its free end the flexible wire-like hook 200 on a rotative pivot shaft 203 carried in the ends of a channel 204, which hook lifts as the cam follower 198 rides on cam dwell surface 183. Thus, as the arm 187 is raised by cam 180, the effect is to raise the hook so as to catch under the lid L of the carton C shown in phantom in FIG. 19B. The cam dwell acts against the tension of spring 196 and lifts the lid a sufficient distance at the labeling end of the carton so as to fully expose the end wall E. Thus, it will be appreciated that only that end of the lid is lifted to clear the end wall. Spring 196 will bring the hook down to re-seat the lid once more on the upper edge of the carton. The hook acts in a manner somewhat equivalent to a shoehorn in bringing the lid back into place, and as a practical matter can consist of merely a bent piece of flexible wire held at the end of shaft 203 as by a bolted strap 205. Thus, the hook, in being lowered, presses the upper margin of the carton back so that the lid can drop into place.

It is desirable to give the hook a straight line movement in a vertical plane, and this is readily accomplished by providing a fixed cam block 206 which is fastened to the vertical frame plate 193 and is engaged by a cam follower finger 207 keyed to shaft 203. A torsion spring 208 acting on shaft 203 biases the follower against the cam surface of cam 206. Accordingly, it will be understood that as the bar 187 is raised the follower 207 rides on the cam surface and rotates shaft 203 counterclockwise to compensate for the arcuate movement that the hook would otherwise have by virtue of its rotating about the pivot pin 190.

A stop block 209 is fixed to the frame plate 193 against which the shaft 203 abuts by bias of spring 196, to serve as a limit stop for the downward movement of the hook.

THE CARTON CONVEYING AND HANDLING SYSTEM

Referring to FIGS. 1, 1A, 2, 3, 12, 16–18, for the purpose of placing cartons in position to be labeled, the belt conveyor 28 comprises a series of parallel belts 30 sliding on support rails 31 (FIG. 1A) and arranged on end rollers 255 (FIG. 1), which belts run through a tensioning roller device 260 (FIG. 1) and around a roller 266 (FIGS. 1, 12, 18) which is connected to a belt motor 268, via a V-belt 270 and is continuously rotated thereby.

Referring to FIGS. 1, 2A, 2B, 13–15, the cartons are operator fed or belt fed to a free roller feed device 275 which consists of a sloped bank or plurality of roller discs 278 in alternate arrangement and freely rotative between spacers 278a on aparallel shafts 283, which shafts are carried by the framing members 285. Thus, cartons move by gravity on the slanted roller device toward the feed belt conveyor 28, as shown in FIG. 1. In position between two rows of discs 278 is a feed gate 287 comprising a plurality of feed gate fingers 290, interdigitated between a pair of shafts 283, as shown in FIGS. 2A and 2B. Each finger 290 is keyed by pins 293 to an individual shaft 296. Shafts 296 (FIGS. 13–15) are carried in their respective bearing blocks 300 carried on a bar 304 rockable on a shaft 310 carried by the framing members 285. The blocks 300 are fastened to a strip 315 by the screws 317 and strip 315 is fastened to bar 304 by screws 318.

Each shaft 296 carries a torsion spring 322 which biases the respective shaft counterclockwise as shown in FIG. 14. Each finger 290 is thus always biased against a fixed shaft or bar 326 carried between the framing members 285. Bar 304 may be rocked about the shaft 310, as seen in FIG. 14, by pneumatic cylinder 327 and rod 327a so that the fingers 290 will be momentarily depressed, that is, they will move clockwise, being cammed against bar 326, to release a carton from tips 330. Thus, tips 330 of each finger 290 will move below the carton corner releasing the carton which can then by gravity move over the bar 326, riding on small rollers 333 carried by that bar, and gain entrance to the belt conveyor 28 (FIGS. 1 and 2). This action occurs for one carton at a time, each being carried in turn onto the belt entrance.

Rocking of bar 304 moves fingers 290 very briefly, and the carton weight holds the fingers down, but they are immediately snapped to the upper position by respective tension springs 322 to catch the leading edge of the next succeeding carton after the trailing edge of the first carton rides past.

The springs 322 are sufficiently sensitive so that they will remain depressed by the weight of a carton of a few ounces yet cause the fingers 290 to snap up to block movement of the next succeeding carton. The action of the pneumatic cylinder 327 is momentary in order to achieve the desired effect; in other words, it quickly rocks the bar 304 to depress the fingers 290 below the leading edge of a carton being held and then brings it back immediately to blocking position.

After a carton is released to the belt conveyor entrance (FIGS. 1, 1A and 2), it is stopped by a label gate 335 comprising fingers 336 which are interdigitated with the spaced belts 30. The label gate fingers 336 all move integrally in unison and are keyed on a rockable shaft 340 carried by the machine frame, the shaft being suitably connected to pneumatic cylinder 343 which can rock it via rod 343a to cause the fingers 336 to move below the surface of the belts to release a carton or to move to the upper position shown to prevent movement.

THE CARTON POSITIONING AND CLAMPING MECHANISM

Referring to FIGS. 1A, 2, 3 and 6–11, a carton C, as indicated in FIGS. 2 and 3, is in position for labeling while a second carton C is shown about to be blocked by the fingers 336 of label gate 335 awaiting its turn to move to the labeling mehanism. It can be assumed that a third carton is being held by the feed gate and that an entire series of cartons can be placed adjacent each other on roller bank 275. The transverse positioning mechanism 350 (FIG. 1A) is holding a carton (FIG. 2) and positioning it to receive a label. Clamp sets 385 and 390, respectively, comprised of clamping fingers 393 (FIG. 10) are actuated simultaneously to swing upwardly (FIGS. 1A and 3) between the belts 30 and to move towards each other to grip the carton sides and position the carton in front of the labeling drum, as shown in FIG. 2.

Normally, the clamping fingers are below the belt surface (FIG. 6), each set of fingers being carried on a rotative shaft, such as 395, having rotative support in the ends of housings, such as 396, the housings being slidable on fixed bars 398 secured by threaded ends to plates 399 which are fastened to the machine frame.

The shafts 395 have respective pinions 400 and 405 keyed thereto. Pinion 400 meshes with a pinion 404 supported on a shaft 406 (FIG. 9) having rotative mounting in the respective housing 396 and the pinion 404 meshes with a rack 408 connected to the piston rod 409 of a pneumatic cylinder 410. Accordingly, movement of the piston rod 409 will reciprocate rack 408 to cause rotation of pinion 404 to thus rotate pinion 400 effecting rotation of shaft 395 to pivotally lift the fingers 393 of the set of clamping fingers 385, the finger thus moving up between belts 30 to a vertical plane, or substantially so.

Rack 408 is meshed with a double pinion 411 which meshes with an offset rack 412 in turn meshing with the pinion 405 carried on the right-hand shaft 395 of FIG. 7, for clamp finger set 390. Thus, movement to the right, as seen in FIG. 7, of rack 408, will cause rack 412 to move to the left rotating its respective shaft 395 and raising its respective set 390 of clamping fingers 393. The lifting of the clamping finger sets thus occurs simultaneously.

The initial condition of the housings 396 is at their extreme outer positions being held there by magnets 415 suitably secured to respective fixed plates 399. The outer wall of each of the housings 396 is provided with a ferrous button 416 so that the respective magnets can hold the housings in position at their outermost limits until the clamping finger sets are fully raised to vertical position, at which time collars 420 at the rack ends engage respective housings and continued movement of piston rod 409 pulls the housings away from the magnets so that the raised finger sets, now vertical, move toward each other to clamp the sides of a carton, FIGS. 2 and 3.

In order to lock the clamping finger sets in vertical position, each shaft 395 (FIG. 10) has pinned thereto a latch plate 429 having a notch 432 coacting with a pawl roller 435 carried on an arm 446 pivoted on a pin 449 carried on the housing 396 and biased by a tension spring 451 so that, as viewed on FIG. 10, the pawl will snap into notch 432 when finger 393 has rotated counterclockwise to vertical position. Thus, the set of clamping fingers on that bar 395 is locked in a vertical plane, the same action occurring for the other bar 395. For purposes of release, a solenoid 453 is energized to rock lever 446 out of notch 432 permitting reverse rotation of the clamping finger set 390 as effected by cylinder 410, all fingers 393 then rotating below the belt level.

As will be noted on FIGS. 8 and 10, each of the fingers carries a conical roller 456, which element actually engages the carton wall and the mode of attachment and securing of each of the fingers to its respective bar 395 is as shown in FIG. 8 by a clamping bolt and split collar arrangement 460.

The clamping finger set 385 as seen in FIG. 8 carries a microswitch MS–7 having the arm-carried button 463 for engaging the side of a carton. The microswitch MS–7 may be located on any one of the fingers 393, for example, as seen on one such finger in FIG. 6.

The purpose of the microswitch MS–7 is to stop movement of the cylinder rod 409, through associated circuitry to be explained, so that predetermined holding force is applied to the sides of the carton without causing damage to it. This is accomplished by equalizing the pressure in the cylinder on both sides of the piston (not shown).

The positioning mechanism 350 for cartons likewise includes a pneumatic cylinder 490 (FIGS. 1A, 2 and 3) carried by the machine frame and having a piston rod 493 carrying a pusher plate 496 which exerts a force on the outer end of the carton to push it against a stop plate 498 adjacent the drum 32, as best seen in FIGS. 1A and 3. Air pressure for the cylinder 490 is controlled by the microswitch MS–7. Thus, after the clamping finger sets have engaged the carton sides, the pusher 496 then comes into play pushing the carton against stop 498, which is easily effected due to the conical rollers 456 on the clamping fingers, which rotate as the carton is thrust home.

THE MAGAZINE CONSTRUCTION AND ACTUATION

The label holding mechanism as shown in FIGS. 20 and 20A comprises the removable magazine 38 shown in perspective in FIG. 20A, which will be seen to be a box-like framework of sheet metal panels 500, 501, 502, 503 suitably secured together by integral bent corner angles, as by riveting, welding or the like, to form a rectangular container open at the top and bottom.

It will be further noted that such magazine has an open cut out 550 in the center of one long panel 503 to facilitate placing labels within the magazine in a stack 552 as indicated on FIG. 20. Around the bottom edges of the panels are suitably spaced cleats 553 which hold respective support elements 556a and b of wire or the like that protrude slightly into the interior and are bent to form horizontal support surfaces which carry the label stack by engaging the bottommost label. Also, the other long panel 501 of the magazine is provided with small cut outs 559 through which air from the perforated tube 133, FIG. 2E, previously described, passes to impinge against the lowermost labels to facilitate separation of the bottommost label when engaged by the nozzle head 84. The rectangular holder 562 is fixed to the machine frame in any suitable manner and is open at the top and bottom, as heretofore explained.

The magazine 38 fits slidably in the holder 562 and is properly spaced therein by abutment of the various magazine panel edges 565, 566 and 568 with the walls of the holder. The botom corner edges of the panels 565 and 570 of the magazine rest on flange 563 (FIG. 2E) above actuating member 572 in the form of a bracket as shown in FIG. 20 which is secured to a shaft 574 rotatively pivoted in side plates 576 carried by the magazine frame, and which bracket has a bar 577 engageable with the lower edges of panels 570. A center leg 578 of the bracket is pivoted to the piston of pneumatic cylinder 82. Accordingly, actuation of the cylinder will swing the bracket 572 upward to raise the magazine 38 thus pulling the bottommost label away from the stack after it has been gripped by the nozzle head 84 as heretofore explained in conjunction with FIGS. 2E–2H.

The magazine 38 has a tab 580 by which it can be readily lifted or inserted into the holder. It will be obvious that different sizes of magazines for different sizes of labels may be readily substituted for each other. The only criterion for a series of magazines is that the outer edges such as 565, 566 and 568 which engage the internal walls of the holder be spaced so as to give the same overall dimensions for a plurality of magazines.

PNEUMATIC SYSTEM

FIG. 22 illustrates diagrammatically the pneumatic system of the invention, which is connected by a supply valve 602 to a conventional compressed air supply line 143. Valve 602 is connected in series with an air filter 604 and air lubricator 606 connected by a main conduit 608 to air pressure regulators 610, 612, 614, 656 and 676. Compressed air conduit 608 is also connected to needle valves 618 and 620.

Air pressure regulator 610 is connected by conduit 622 to a four-way solenoid valve 624 connected by compressed air lines 626 and 628 to cylinder 327 for feeder gate actuation (FIGS. 1 and 2B), for operation of feeder gate 287. Air regulator 610 is also connected by conduit 630 to four-way solenoid valve 632. Solenoid valve 632 is connected by conduits 634 and 636 to cylinder 343 for control of the label gate 335, FIG. 1.

Air regulator 612 is connected to four-way solenoid valve 637 which is connected by conduits 638 and 640 to cylinder 490 to operate carton positioner plate 496, FIG. 3.

Air regulator 614 is connected by conduit 641 to four-way solenoid valve 642 connected by conduit 644 to cylinder 410 which actuates clamp sets 385 and 390 (FIGS. 1A, 2, 3, 6–11).

Three-way solenoid valve 648 is fed through regulator 610 via conduit 648a and is connected to four-way valve 642 via conduit 649 and further connected by conduit 650 to the piston rod end portion of pneumatic cylinder 410 to neutralize pressure in clamp drive cylinder 410 when clamp finger sets 385 and 390 touch a carton C, FIG. 2.

Air from regulator 614 is slightly higher than air from regulator 610 to provide a net holding force. The coaction of valves 642 and 648 is such that control for cylinder 410 is effected by either feeding or exhausting the ends of the cylinder subject to the circuitry control described hereinafter in conjunction with FIG. 25.

It will be understood that all valves are of conventional multi-way construction as will be understood by persons skilled in the art.

The conduit 649 is of particular significance since it permits flow in either direction between valves 642 and 648.

FIGS. 22A, B, and C illustrate diagrammatically the air flow for control of the clamp sets 385 and 390.

Thus, as the clamp sets move against a carton, air is supplied via valve 642 to the outer end of cylinder 410, FIG. 22A, and the rod end is exhausting via conduit 650, valve 648, conduit 649 and valve 642. However, as the clamp sets reach a gripping position such that MS–7 is closed, the position of the valve 648 is changed, FIG. 22B, closing valve 648 exhaust passage to conduit 649 and opening a pressure passage via conduits 650 and 648a from regulator 610 to feed air to the rod end of the cylinder 410 for a cushioning and holding effect.

Retraction of the clamp sets is subsequently effected as a function of cam C–5, cushion air being shut off from the rod end of the cylinder by actuation of valve 648 which again connects to valve 642 via conduit 649 so that air from valve 642 through conduit 649, valve 648 and conduit 650 can pass to the rod end of the cylinder to withdraw the clamp sets, FIG. 22C.

Air supply line 608 is connected through pressure regulator 656 and thence by conduit 658 to a two-way solenoid valve 659. Three-way valve 660 is connected through vacuum gauge 662 to vacuum pump 20. Valves 659 and 660 are connected via lines 666 to tube 135 (FIG. 21) to change the vacuum to pressure in head 84 the instant the label touches the carton C, thereby releasing the label and blowing it into initial adhesive contact with the carton. Two-way valve 659 and three-way valve 660 are also connected by line 666 to vacuum switch 668 (FIG. 24, line 13) which effects actuation of the auxiliary cam 170 to swing label carrier 22 away from glue roller 78 if nozzle head 84 fails to pick up a label from magazine 38.

Needle valve 618 controls air flow through 669 to label separation tube 133 located at the bottom of the label magazine (FIG. 3D).

Needle valve 620 is connected in series with two-way solenoid valves 670 and 672 and air line 674 via tube 138 to nozzle head 86 to control air which curls labels against the glue roller. Valve 670 is normally open as long as the machine is operating, but closes when the machine shuts down, thus acting to prevent continuous air blow against the labels in magazine 38 via head 86 which would disturb them and might even cause them to be blown out of the magazine. Valve 672 is the actual control for air through head 86, turning it on and shutting it off as head 84 moves past glue roller 78.

A conduit 675 connects from air pressure line 608 through regulator 676 and accumulator 677 to air pressure responsive switch 678 (FIG. 24, line 26) to four-way solenoid valve 682 that controls pressure to cylinder 60 for operation of pad 63 to press labels against cartons.

Air line 608 is connected to air line 690 connected to valve 692, controlled by solenoid S15 (FIG. 25, line 20). The valve is connected by conduits, as shown, to control magazine lifter air cylinder 82.

ELECTRICAL CONTROL SYSTEM

The control circuitry is of generally conventional nature and no claim is made as to any novelty therein. Various circuit arrangements may be devised as a matter of routine electrical engineering for the purpose of effecting the sequence of operations of the mechanical components of the machine as effected through solenoid valve control of the pneumatic system. However, for purposes of effecting a complete disclosure so as to enable persons skilled in the art to practice the invention, one circuit arrangement is illustrated hereinbelow.

Reference is made to FIGS. 22, 23, 24, 25, and 26, wherein FIGS. 24 and 25 show "in line" electrical diagrams which form a composite and complete electrical circuit, the upper end of FIG. 24 being understood to be joined to the lower end of FIG. 25.

Referring particularly to FIG. 24, lines 1 through 4, switches 706, 714 and 722 will be noted as connected for control, respectively, of label drum motor 26, vacuum pump 20 and conveyor belt motor 268, all as heretofore described in the specification.

Respective indicator lights 710, 718 and 726 are associated with the motors and reference is made to FIG. 26 showing the toggle switches on the control panel (FIG. 2) corresponding to the reference numerals just enumerated for the control switches.

AC power will be understood to be fed via leads 702 and 704. Diagram lines 4 and 5 (FIG. 24) show a transformer T–1 across the power leads for reducing voltage to 90 volts DC for relay control purposes, the transformer secondary being rectified by the double diode arrangement shown, center taps from the double diode and the transformer secondary feeding 90 volts DC to the leads 750 and 760, the diode connection being through a resistor R–5 to lead 760 and through a capacitor C5 to lead 750. A voltage regulating Zener diode 757 is across the low voltage DC leads.

The several microswitches MS1 through MS6 (FIGS. 4, 4A, 5 and 5A) which are actuated by the respective cams C–1 for MS1 and MS6 are shown on the electrical diagrams as contacts, such as MS5B, etc., having functions hereinafter described. The various valve control solenoids S1, etc., via relays K–1, etc., responsive to the microswitches in a conventional manner to be described.

It should be noted that the photoelectric beam and circuitry is indicated as P.E. on FIGS. 1A, 2 and 25. FIG. 25 indicates this in a phantom box on line 33 and includes therein the relay K11, which will be understood to be part of a conventional photoelectric pick-up and amplifying system of any suitable kind commonly used with conveyors for detecting moving articles in order to effect system control functions.

The switches and buttons shown in the control panel diagram of FIG. 26 for control purposes are likewise found in FIGS. 24 and 25, the button 800 and the switch 802 being found in line 17 of FIG. 24, while the switches 884, 896 and button 902 are found, respectively, in FIG. 25. lines 34, 38–39, 40. Switch 820 has three parts designated as 820A, 820B and 820C, and will be found, respectively, in FIG. 24, line 19, FIG. 25, lines 31 and 33.

Various electrical components heretofore described are likewise shown in the diagram, such as the solenoids 453 (FIG. 10) which will be found on FIG. 25, line 23 and 24. Likewise, referring to FIG. 22, the vacuum switch 668, which operates auxiliary cam 170 for preventing the nozzle head from contacting the glue roller, in the event a label is not picked up, is noted in FIG. 24, below line 14, and air pressure switch 678 is noted in FIG. 25, line 26.

Various conventional electrical components, such as fuses, suppressor diodes, etc., will be noted on the diagram purely for completeness, but are not specifically described, inasmuch as their use is entirely commonplace wherever required.

The functions of the electrical circuitry are controlled by the several switches and buttons of FIG. 26 as follows:

Test—Operate switch 884

With switch in "operate" position, the machine will operate normally.

With switch in "test" position, the feeder gate 287 and the label gate 335 (FIGS. 1 and 2) will both stay in the upper position above belt 28, thereby preventing cartons from entering the machine. This enables testing the labeling drum and its functions without interference from the carton flow.

Manual—Automatic switch 896

With switch in "manual" position, the cartons can be labeled one at a time by pressing the "label gate" button once for each carton. This feature is necessary when label changes occur extremely often.

With switch in "automatic" position, the machine will continue to label automatically provided cartons are constantly supplied to the feeder gate.

Prelabeled—Label switch 820

With switch in "prelabeled" position, the label drum cannot function and, with the gates both down, allows the cartons to move on conveyor 28 (FIGS. 1 and 2) without interference. This allows prelabeled cartons to pass rapidly through the machine when machine labeling is not required.

With switch in "label" position, the machine will function normally to effect labeling.

Manual start button 902

When first starting the machine or after making a label magazine change, the "manual start" button is pressed causing the label gate 335 to release cartons, one at a time, thereby allowing them to cut the photo-cell beam P.E., thus controlling the machine automatically.

Feeder gate button 800

With switch in "continuous" position, the "feeder gate" button may be pressed and the feeder gate 287 will stay in lower position allowing cartons to flow to the conveyor belt entrance towards label gate 335 continuously.

With switch in "index" position, the cartons will enter the conveyor belt through the feeder gate one at a time automatically. If the "feeder gate" button is pressed when switch is in "index" position," the feeder gate 287 will go down and come up again the instant the button is released.

Label gate button 876

With switch in "continuous" position, the "label gate" button may be pressed and the label gate 335 will stay in the down position allowing cartons to be continuously carried off on the conveyor.

With switch in "index" position, the cartons will be released by the label gate 335 one at a time automatically. If the label gate button is pressed when switch is in "index" position, the label gate will move down and come up again the instant the button is released.

It will, of course, be understood that switch 732 (FIG. 24) which controls power to lead 702a must be in the "On" position along with the switches 706, 714 and 722, all shown in FIG. 24 (lines 1–3) in order for the machine to be fully operative.

Assuming the drum 32 is stationary and carrier 22 is held at the magazine 38 by lever 113 in notch 116 (FIG. 5), a normal automatic cycle of operation is started by closing of switches 706, 714, 722, 732, 884 (line 34), 896 (line 38), 820 (A and B, lines 19 and 31, respectively), and 802 (line 17), the manual start button 902 (line 940) is pressed. Thus, relay K1, (line 40) is energized and seals in through normally open contact K1A (line 39). Normally open contact K1B (line 34) closes to energize the label gate solenoid S5 (line 34) admitting air to cylinder 343 (FIGS. 1 and 22). Thus, the label gate 335 (FIGS. 1 and 22) is opened permitting a carton to move on the belt 28.

The leading edge of the carton breaks the photocell beam P. E. (FIGS. 1A and 2) energizing, in a conventional manner, the relay K11, shown within the photocell circuit phantom box (line 33) to close normally open contact K11A (in phantom box) which energizes relay K9 (line 33). This causes the normally closed contact K9D (line 31) to open and normally open contact K9B (line 31) to close. This conditions relay K3 (line 31) for energization to follow. A normally open contact K9C (line 19) at this time energizes a relay K10 (line 19) which seals in through normally open contact K10A (line 19). Relay K10 also operates normally open contact K10B1 (line 18) and normally closed contact K10B2 (line 18). Closure of K10B1 and the opening of K10B2 gives a momentary energization of relay K2 (line 18) for a period determined by the value of the capacitor C1 (line 18) and the impedance of the solenoid relay K10. Accordingly, the solenoid S6 (line 17) is energized momentarily which pressurizes via valve 624 (FIG. 22) the feeder gate cylinder 327 (FIGS. 1 and 22) momentarily depressing the fingers 290 (FIGS. 2B and 14) to permit a carton to roll down the roller bank 287 (FIGS. 1 and 2) toward the label gate 335 to be stopped at that gate, this being held until any carton being processed at the labeling drum 32 is released by the clamping fingers 393 and passes downstream on conveyor 28 (FIG. 2).

As the trailing edge of the carton clears the P.E. beam, contact K1A (phantom box, line 33) is opened due to the deenergization of relay K11 and thus relay K9 (line 33) is deenergized causing normally open contact K9B (line 31) to reopen and effecting closure of normally closed contact K9D (line 31). This transfer of contact function permits momentary energization of relay K3 (line 31) for a period determined by the value of capacitor C2 (line 31) and the impedance of relay K3. Relay K3 is sealed in upon energization by normally open contact K3A (line 30) and normally open contact K3B (line 27) energizes a time delay relay K4 (line 27) and at the same time normally closed contact K3C1 opens and normally open contact K3C2 closes (both in line 35) to energize relay K5 via contact K3C2 which seals in through normally open contact K5B (both in line 35). Accordingly, normally closed contact K5C (line 40) opens to deenergize relay K1 (line 40) which effects unsealing and deenergization of the label gate solenoid S5 (line 34) due to opening of contact K1B (line 34). This action pressurizes the label gate cylinder 343 (FIG.1) to extend the gate 335 upwardly between the belts, and the carton, hereinabove described, is stopped on the conveyor 28 at that point while the belts 30 merely slide thereunder (FIG. 2).

With energization of relay K5 normally open contact K5A1 (line 22) closes and normally closed contact K5A2 (line 24) opens to, respectively, energize the carton clamp finger solenoid S4 (line 22) and deenergize the clamp release solenoids 453 (FIG. 10, lines 23 and 24). Accordingly, the solenoid S4 opens air valve 642 (FIG. 22) and the cylinder 410 (FIGS. 6 and 22) is pressurized to raise the clamp finger sets 385 and 390 (FIGS. 3, 6– 11). At this time, the carbon is disposed generally between the clamp finger sets and the raising and moving together of the finger sets centers the carton in front of the drum 32 (FIGS. 2 and 3), the clamping action continuing until the microswitch MS7 (line 21) carried by one of the fingers 393 (FIGS. 6 and 8) is closed by being pressed against the carton, thereby energizing the solenoid S9 (line 21) for valve 613 (FIG. 22) and the neutralizing pressure solenoid S-11 (line 20) for valve 648. The valve 613 pressurizes the pusher or positioning cylinder 490 (FIGS. 2C, 3 and 22) of the positioning mechanism 350 to move the carton up against the stop 498 in position to receive a label while the valve 648 admits air to the other side of the piston in cylinder 410 to cushion and hold the piston stationary, to prevent damaging of the carton walls which are gripped between the clamping finger sets.

At this time, the relay K4 has reached the end of its time delay interval, which is sufficient to permit the movement of the clamped finger sets from below the belt into gripping position of the carton, and normally open contact K4A (line 26) closes to energize the solenoid S13 (line 26) which controls the clutch 25A (FIG. 1) and effects rotation of drum 32 which at this time is stationary, the carrier 22 picking up a label, the drum having been stopped via MS6 in the previous cycle as later explained.

It should be noted, at this point, that a pressure responsive switch 678 (line 26, FIG. 22) is included in the clutch solenoid circuit to prevent energization of the solenoid, in the event of failure of air pressure or insufficient air pressure required for proper operation of the various components of the machine.

Assuming the drum is now rotating, cam C-1 opens the microswitch MS1 (line 12, FIG. 24) briefly and then permits it to close. This is merely a safety measure in the event that the nozzle head 84 fails for any reason to pick up a label, and the function of MS1, which consists of a normally closed contact (line 12), is to reset a portion of the circuitry at the beginning of each cycle in the expectation that the nozzle head 84 will pick up a label on the ensuing drum rotation. Thus, microswitch MS1 is effective in the control of the machine only upon repeated failure of the nozzle head to pick up labels, as will be hereinafter described in detail.

Continued rotation of the drum 32 actuates via cam C-2, the microswitch MS2, which has a normally open contact (line 14) that controls energization of solenoid S1 (line 14) to open valve 672 (FIG. 22) whence air under pressure passes to the nozzle head 86 to effect curling of a label around the glue roller 75 to fully coat the label surface (FIG. 3D).

It will be noted that vacuum pump 20 is normally connected to nozzle head 84 via valve 660 (FIG. 22) maintained open by solenoid S10 (line 9) via normally closed contact MS3A (line 9).

Subsequently, as the carrier 22 reaches the labeling position, microswitch MS3 is actuated by cam C-3 whence the normally closed contact MS3A (line 9) is opened and normally open contact MS3B (line 8) is closed, to, respectively, deenergize solenoid S10 (line 9) and energize solenoid S2 (line 8).

Deenergization of solenoid S10 effects closure of the vacuum or suction control valve 660 (FIG. 22), thus cutting off suction to the nozzle head 84, and energization of solenoid S2 opens valve 659 (FIG. 22) to admit a burst of air through the nozzle head 84. Accordingly, the label, having been applied over a portion of its area by the nozzle head, is then blown away from the nozzle head into adherence with the carton end as will be appreciated from FIGS. 3 and 3A and as described elsewhere in the specification.

Pressure pad 63 (FIG. 3) is now brought into action as rotation of the drum closes microswitch MS4 to energize solenoid S3 (line 15) via normally open contact MS4 in series therewith. This pressurizes the cylinder 60 (FIGS. 3 and 22) for as long as MS4 is held closed, the valve automatically pressurizing the other end of the cylinder when MS4 opens as cam C-4 leaves it. Thus, pad 63 firmly pressures the label against the carton.

In the continued sequence of drum rotation cam C-5 closes microswitch MS5 which opens the clamp finger sets 385 and 390 (FIGS. 2 and 3) and at the same time actuates the label gate 335 (FIG. 2) to release the carton held thereby. Thus, upon closure of MS5 the normally open contact MS5B (line 39) closes to energize relay K1 in series therewith which initiates the next cycle, and the normally closed contact MS5A (line 37) opens to deenergize relay K5 (line 35) whereupon normally closed contact K5C (line 40) recloses.

When relay K5 drops out, normally open contact K5A1 (line 22) opens and deenergizes solenoid S-4 which actuates valve 642 (FIG. 22) to give pressure to the exhaust port of valve 648; normally closed contact K5A2 (line 24) closes to energize solenoids 453 which releases the respective clamp fingers (FIG. 10); and normally open contact K5D (line 21) opens to dnrgiz solnoid S-11 to actuate valve 648 to allow pressure from valve 642 to reach the rod end of cylinder 410, and deenergizes solenoid S9 to activate valve 637 to withdraw the carton positioner pad. Thus, the carton is released and continues movement downstream on the conveyor belt.

The drum continues its rotation whereupon cam C-1 closes microswitch MS6 which effects stopping of the drum.

Thus, momentary closing of MS6 energizes relay K8, (line 16) which relay is momentarily energized by the opening of normally closed contact MS6A and closing of normally open contact MS6B which energizes K8 for a length of time determined by impedance of the relay and the values of the resistance R3 and capacitor C3 (line 16). Such momentary energization opens the normally closed contact K8A (line 31), which deenergizes the relay K3 (line 31) in turn deenergizing the relay K4 due to opening of contact K3B (line 27). Accordingly, contact K4A opens to release the clutch solenoid S13 (line 26) whence the clutch 25a (FIG. 1) ceases to drive the drum. At the same time normally open contact K8C (line 25) closes to momentarily energize the brake solenoid S14 (line 25) thus stopping the drum by means of brake 25b (FIG. 1). At this time the nozzle head 84 is below the bottommost label in magazine 38 (FIG. 3) and the drum is actually free of both clutch and brake. However, as elsewhere described in detail, the cam follower roller 113 (FIGS. 5, 5A) on lever 110 is then pulled by spring 116 to the bottom of the detent notch 128 in the cam 120, which positions the drum perfectly for nozzle head 84 with respect to the label it is to pick up (FIGS. 3 and 5).

It will be understood that suction is being applied continually to nozzle head 84 so as to effect label pickup, which suction continues until it is time to blow the label against the carton as effected by the operation of the circuitry explained hereinabove.

It being noted that the drum is stopped and held in position, the nozzle head 84 engages the bottommost label, FIG. 2E. At this time, from the foregoing description, the momentary energization of relay K8 (line 16) has ceased. Contact K8A (line 31) closes, which energizes relay K3 (line 31) to close contact K3D (line 28). Accordingly, a delay relay K13 (line 28) is energized via contact K3D to close contact K13A (line 20) and thus energizing the dual solenoid S15 (line 20). Solenoid S15 opens valve 692 (FIG. 22) to actuate the air cylinder 82 (FIG. 20) thus lifting the label magazine 38 whereby the stack of labels is pulled away from the bottommost label which has now been gripped by the nozzle head 84. Relay K13 has a sufficient time delay, about half a second being found sufficient, to permit the magazine action and label carry away function.

Finally, the drum being stationary, the carton which was released by energization of relay K1, which effected actuation of the label gate 335 via valve 632 actuated by solenoid S5, has now reached the photocell P.E. (FIG. 1A) whereupon a repeat cycle commences, all as described hereinabove.

In instances where labels may stick together, which might cause nozzle head 84 to fail to pick up a label, it is desired that the nozzle head not come in contact with the glue roller 78 and thus become fouled with glue.

The effect is accomplished by the auxiliary cam device 170 heretofore described in conjunction with FIGS. 21A and 21B and which is controlled by the solenoid S7 (line 11). Thus, the solenoid as heretofore explained will thrust the cam 171 in the path of roller 113 causing the label carrier to swing downwardly away from the glue roller 78.

The control of solenoid S7 is via the relays K6 and K7 (lines 14 and 12, respectively). Thus, the momentary opening of microswitch MS1 by cam C-1 which occurs shortly after the label carrier has left the magazine, presumably with a label thereon, will deenergize relays K6 and K7 provided vacuum switch 668 is open at that time due to heavy suction in line 135 caused by a label being on the carrier and blocking the perforations of nozzle head 84. In such case, no energization of relays K6 and K7 can occur since the line is open thereto at switch 668. Accordingly, contact K6A (line 12) remains open and solenoid S7 is not energized.

If, however, no label is picked up, switch 668 is closed due to the increase of pressure in line 135 and upon the closing of contact MS1, after cam C-1 has passed it, a continuous circuit extends through the relays up to the contact of microswitch MS2 (line 14). Upon the subsequent closure of MS2, caused by rotation of drum 32, a complete circuit is established energizing the relays K6 and K7 and actuating the cam device 170. Contact K6A (line 12) of relay K6 effects sealing in of relay K7 after MS2 opens to maintain the circuit conditions described below as long as the no label condition persists. However, each time microswitch MS1 opens, it deenergizes the relays K6 and K7 so that these relays may function each time the label carrier moves away from the magazine without a label, or if they remain deenergized, the machine is restored to full functioning.

A further effect of energization of relay K6 is the opening of normally closed contact K6B (line 40) in order to prevent energization of relay K1 upon the ensuing closure of microswitch MS5 by cam C-5 as the drum continues its rotation. Thus, the label gate 335 is prevented from releasing any carton which it is holding inasmuch as release of the gate depends upon complete circuitry action responsive to MS5 as described above. This is due to the normally open contact K7B (line 36) which shunts normally closed contact MS5A (line 37) to prevent deenergization of K5 (line 35) when microswitch MS5 is actuated.

Accordingly, the automatic cycle is broken and the drum is rotated with no label on the carrier and no carton has been admitted by label gate 335 to break the photocell beam. In order to permit the drum to re-start after completing such revolution, normally closed contact K7A (line 29) is included. Thus, after the drum completes its revolution, microswitch MS6, opening and closing, actuates relay K8 (line 16) momentarily via the transfer of contacts MS6A and MS6B (line 16) to momentarily deenergize relay K3 (line 28) due to opening of normally closed contact K8A (line 31). Relay K3 remains energized momentarily, however, because of the delay effect of capacitor C3 on relay K8 in becoming deenergized. Since contact K7A (line 29) is still closed the subsequent re-closing of contact K8A re-energizes relay K3 to energize the time delay relay K4 via closure of contact K3B to re-start the drum after a time delay. At the commencement of such drum rotation microswitch MS1 is opened to deenergize relays K6 and K7 which returns the machine back to automatic operation so that labels, if on the carrier 22, can be glue-coated.

If the carrier 22 again fails to pick up a label the entire sequence is repeated and continues to be repeated until ultimately a label has been picked up, at which time the automatic cycle is restored due to the fact that the suction in the line to the nozzle head 84 will maintain the vacuum switch 668 open.

In manual operation, the switch 896 shown on the control panel (FIG. 26) is thrown to manual position (lines 38–39). This prevents microswitch MS5 from re-energizing K1 (line 40) thus breaking the automatic cycle, it being noted that switch 896 is shown in open position on FIG. 25 and is in series with contact MS5B (line 38). However, cartons may be labeled under manual control by pressing button 902 (FIG. 26, line 40) once for each carton to be labeled.

It is desirable to prevent air blast through the label curling nozzle head 86 when the control circuits are switched off. Accordingly, a solenoid S12 (line 10) is provided which controls valve 670 (FIG. 22) and maintains that valve open to permit air through to tube 86 at all times when the machine is operating. However, solenoid S1 (line 14) controls a valve 672 in series with valve 670 and controls air to the nozzle head 86 by action of MS2 which is in series with solenoid S1.

What is claimed is:

1. A labeling machine comprising a supporting frame means, a conveying means carried thereby and a rotary drum adjacent to said conveying means, said drum comprising a label carrier rotating therewith for picking up a label from a magazine adjacent said drum and applying said label on a carton carried on said conveying means, positioning means adjacent said conveying means for positioning said carton with respect to said drum so as to receive said label as said drum rotates, and feed means for feeding cartons individually from one end of said conveying means to said positioning means, a pressure pad means disposed within said drum and means for effecting reciprocal movement thereof toward said conveying means to press a label against said carton, and lid lifter means disposed adjacent to said conveying means for lifting the lid of said carton prior to application of a lebel thereto by said label carrier.

2. In a machine as set forth in claim 1, including a label magazine disposed adjacent said drum for handling a stack of labels wherein the bottommost label is exposed and engageable by said label carrier, and means for moving said magazine to separate said stack from said label carrier at the time of engagement thereof with said bottommost label whereby said carrier carries said bottommost label away free of said stack.

3. In a machine as set forth in claim 1, said conveying means comprising a plurality of spaced belts and said positioning means comprising a plurality of clamping means movable from a position below said belts to a position above said belts through the spacings between said belts.

4. In a machine as set forth in claim 1, including a glue applying device adjacent said drum and in the path of movement of a label carried by said label carrier and comprising a multi-grooved roller and respective pickup fingers within the grooves of said roller to ensure separation of labels therefrom, said fingers being disposed adjacent to the bottom of said roller.

5. In a machine as set forth in claim 1, said label carrier comprising nozzle means and means for effecting suction or airblast therethrough, and further comprising a nozzle means and means for effecting airflow therethrough, wherein said first nozzle means effects label pickup from said magazine by suction and label application to said carton by airblast, and means responsive to rotation of said drum for effecting suction or airblast at predetermined times, and means for effecting airflow through said second mentioned nozzle means when a label carried thereby is brought into engagement with said glue mechanism, said glue mechanism having a glue applying surface against which said label is moved and said airflow ensuring contact of said label with said surface.

6. In a machine as set forth in claim 1, said carton feeding means comprising a bank of freely rotative rollers arranged in rows, a gate means disposed below adjacent rows of rollers and movable upwardly therebetween to hold cartons from coasting down said bank of rollers, and means for effecting movement of said gate means responsive to movement of cartons on said conveyor means.

7. In a machine as set forth in claim 6, said conveyor means comprising a plurality of spaced belts and additional gate means normally disposed therebelow and having elements movable upwardly through the spacings between said belts, and means for effecting such movement to hold individual cartons in position on said belts prior to releasing them for movement toward said positioning means responsive to a carton being released by said positioning means.

8. In a machine as set forth in claim 1, including cam elements rotative with said drum and circuitry means controllable by said cam elements for effecting a predetermined sequence of operation of said feed means, said positioning means, said label carrier, and said lid lifter means.

9. In a machine as set forth in claim 1, including a rotary cam carried by said drum, said lid lifter means comprising a lever means and a hook thereon, and means whereby said lever is actuated by said cam to effect hooking of a carton lid and lifting thereof prior to application of a label to said carton.

10. In a machine as set forth in claim 1, including a cam rotated by said drum, said lid lifter means comprising a pivotal bar having a hook thereon, and means whereby said bar is pivotally lifted by said cam to effect hooking of a carton lid and lifting thereof prior to application of a label to said carton, and said hook being pivotally carried by said bar on an axis parallel to the path of movement of cartons on said conveying means and means for effecting movement of said hook in a plane normal to said path of movement of said cartons as said bar is pivotally lifted to effect a straight line vertical movement of said hook.

11. A labeling machine comprising a supporting frame means, a conveying means carried thereby and a rotary drum adjacent to said conveying means and having an open side, said drum carrying a label carrier rotative therewith for picking up a label from a magazine disposed outside said drum and partially depositing said label on a carton carried on said conveying means, means adjacent said conveying means for positioning said carton with respect to said drum so as to receive a label from said label carrier as said drum rotates and means for feeding cartons individually on said conveying means to said positioning means, a pressure pad means disposed within said drum and means for effecting reciprocal movement thereof through said open side to fully press said label against said carton.

12. In a machine as set forth in claim 11, including a label magazine disposed adjacent said drum for handling a stack of labels wherein the bottommost label is exposed and engageable by said label carrier for adherence thereto, and means for moving said magazine to separate said stack from said label carrier at the time of engagement thereof with said bottommost label whereby said carrier carries said bottommost label away free of said stack, said label carrier having a perforate nozzle head for effecting said engagement and means for effecting suction therethrough for label adherence thereto at said time of engagement.

13. In a machine as set forth in claim 12, said means for effecting an air blast through said nozzle head to blow said label therefrom subsequent to said partial depositing on said carton prior to pressing thereof by said pressure pad.

14. A labeling machine comprising a supporting frame means, a conveying means carried thereby and a rotary drum adjacent to said conveying means and mounted on a stationary shaft, said drum comprising a label carrier rotative therewith for picking up a label from a magazine adjacent said drum and applying said label on a carton carried on said conveying means, positioning means adjacent said conveying means for positioning said carton with respect to said drum so as to receive said label as said drum rotates, and feed means for feeding cartons individually from one end of said conveying means to said positioning means, a pressure pad means disposed within said drum and means for effecting reciprocal movement thereof toward said conveying means to press label against said carton, and lid lifter means disposed adjacent to said conveying means for lifting the lid of said carton prior to application of a label thereto by said label carrier, and air conduit means in said shaft for effecting suction in said label carrier and air blast thereto, and a cam rotative with said drum and engaging said lid lifter means for actuation thereof.

15. A labeling machine comprising a rotary drum, said drum having a shaft rockably carried thereby adjacent the periphery thereof having a label carrier secured to said shaft and rotative with said drum for picking up a label from a magazine adjacent the periphery of said drum and applying said label on a carton disposed in a predetermined position relative to said drum, a cam means fixed relative to said drum and a follower means intermediate said shaft and said cam means for effecting rocking of said shaft at a predetermined point in the course of rotation of said drum, a label magazine adjacent said drum, means for effecting adherence of a label to said label carrier and means for stopping rotation of said drum when said label carrier is adjacent said magazine, wherein said shaft is rocked by said cam means to effect engagement of said label carrier with a label in said magazine at said predetermined point.

16. A machine as set forth in claim 15, said cam means comprising a concave surface effecting a detent coaction with said follower means for holding said drum in a precise stationary position at the time rotation stops.

17. In a machine as set forth in claim 16, means for effecting a releasable drive connection to said drum and a brake means, and means for releasing drive connection to said drum and applying said brake means to stop said drum at the time said follower means engages said concave surface and means for releasing said brake means whereby said drum is freely rotative momentarily to enable said cam follower means to effect said detent coaction for precise positioning of said drum.

18. A labeling machine comprising a supporting frame means, a conveying means carried thereby and a cage-like rotary drum adjacent to said conveying means, said drum comprising a label carrier rotative therewith adjacent the periphery thereof for picking up and applying labels on cartons on said conveying means, a magazine adjacent said drum and means for effecting adherence on said carrier of labels from said magazine, means mounting said carrier on said drum to permit relative motion between said carrier and said drum, means adjacent said conveying means for positioning said carton with respect to said drum so as to receive labels from said carrier as said drum rotates, means for intermittently feeding cartons individually on said conveying means to said positioning means, cam means operative to actuate said carrier relative to said drum to a predetermined label applying position, a pressure pad means disposed within said drum and means for effecting reciprocal movement thereof toward said conveying means to press applied labels against said carton, means for effecting free rotation of said drum each time said carrier is in label pickup position, said cam means being operative to hold said drum stationary during label pickup and to predeterminedly position said carrier with respect to said magazine for pickup.

19. A labeling machine comprising a continuously moving conveying means and a rotary label carrier for picking up labels from the magazine adjacent the path of rotation and applying said labels to cartons carried on said conveying means, holding means adjacent said conveying means for holding said cartons adjacent the path of said label carrier so as to receive labels as said carrier moves therepast in a direction normal to the direction of movement of said conveyor means, a pressure pad means and means for effecting movement thereof toward said cartons to press labels against said cartons subsequent to said labels being applied by said carrier.

20. In a machine of the kind described, a label carrier comprising a nozzle device and means for effecting suction or airblast therethrough, and further comprising a second nozzle device and means for effecting airflow therethrough, wherein said first nozzle device effects label pickup from a magazine by suction, and label application to a carbon by airblast, and means responsive to predetermined positions of said label carrier for effecting suction or airblast, and means for effecting airflow through said second mentioned nozzle device when a label carried thereby is brought into engagement with a glue coating surface.

21. In a machine as set forth in claim 20, said label carrier comprising a body member having integral perforated members extending therefrom and comprising said nozzle devices.

22. In a machine of the class described, a conveying means for moving cartons having lids to a processing station for processing thereat and a mechanism for lifting and temporarily holding said lids at an end of said cartons during processing, said mechanism comprising a bar, and means for mounting said bar for swinging in a plane normal to the plane of said carton ends, said bar carrying a hook for engaging and lifting lids and pivotal support means for said hook whereby said hook is pivotal in a plane parallel to the plane of movement of said bar, a fixed cam and a cam follower secured to said hook whereby said hook is rotated toward said carton ends when said bar is raised to effect a straight line motion for said hook.

23. In a machine as set forth in claim 22, spring means for biasing said bar to a downward position and said bar having a cam follower, a cam rotative in synchronization with movement of cartons on said conveying means to lower and raise said bar whereby said hook may engage lids and raise said lids when respective cartons are stationary at said processing station.

24. In a machine of the class described, a conveying means for moving cartons having telescopic lids to a processing station for processing thereat and a mechanism for lifting and temporarily holding one end of said lids at an end of said cartons during processing, said mechanism comprising an element for engaging and lifting carton lids, said element being a flexible hook-like member liftable in a plane parallel to said carton ends and being of sufficiently thin material to wedge between lids and cartons in order to raise said lids when lifted and to effect replacement of said lids on said cartons when lowered, and actuating means for effecting said lifting and lowering of said element.

25. In a machine as set forth in claim 24, said element being a flexible wire bent to form a hook and of sufficiently thin material to wedge between lids and respective cartons.

26. In a machine of the class described, a label holding device comprising a fixed holder and a magazine having slidable movement therein, movable means below said magazine for actuation thereof, label holding members adjacent the base of said magazine and arrayed to hold a stack of labels therein at a plurality of spaced points wherein a portion of the bottommost label is exposed to be gripped by a label carrier moving into engagement therewith, and means for actuating said movable means to move said magazine away from said label carrier when a label is thus gripped so as to separate said stack of labels from said bottommost label.

27. In a machine as set forth in claim 26, said movable means comprising a pivotal bracket, said magazine having side walls engageable by said bracket, and power means connected to said bracket for rocking said bracket to lift said magazine whereby said magazine and the stack of labels therein are separated from said label carrier when said bottommost label is gripped thereby.

28. In a machine of the class described, a label holding device comprising a magazine and means for supporting said magazine whereby said magazine is movable, actuator means, means for supporting a stack of labels in said magazine wherein a portion of the bottommost label is exposed to be gripped by a label carrier, and means whereby said actuator means is operative to move said magazine away from said label carrier when a label is thus gripped so as to separate said stack of labels from said bottommost label.

29. In a machine as set forth in claim 28, said actuator means comprising a member extending below said magazine, and power means connected to said member to lift said magazine whereby said magazine and said stack of labels therein are separated from said label carrier.

30. A carton labeling machine comprising a rotary mechanism having a label carrier provided with means for gripping and removing a label from a magazine and bringing said label into contact with a glue device, means for mounting said label carrier for pivotal movement relative to said rotative means, and means for rocking said label carrier away from said gluing device responsive to failure of said label carrier to pick up a label prior to moving to said glue coating device.

31. A machine as set forth in claim 30, said means comprising a fixed cam, said label carrier having a follower, said fixed cam having a detent notch engageable with said follower to effect a rocking movement of said label carrier for inclining said label carrier at a predetermined angle with respect to said label magazine to grip a label and wherein said follower is maintained in said notch by resilient bias to position said rotary mechanism at a predetermined point with respect to said magazine and to hold said rotary mechanism stationary while said label carrier is gripping a label, said means for rocking said label carrier away from said glue coating device comprising said follower and comprising a cam longitudinally movable over the surface of said fixed cam so as to be in the path of movement of said follower to be engaged thereby to effect said first-mentioned rocking of said label carrier operative to prevent engagement thereof with said glue coating device.

32. In a carton labeling machine, a rotary drum having a label carrier provided with means for gripping and removing a label from a magazine and bringing said label into contact with a glue coating device, means for mounting said label carrier for pivotal movement relative to said drum and actuatable cam means for rocking said label carrier away from said glue coating device responsive to failure of said label carrier to pick up a label prior to moving to said glue coating device, means for effecting suction through said carrier for gripping a label, a pressure responsive device and means operative thereby to actuate said actuatable cam means to effect said rocking of said carrier away from said glue coating device, said actuatable cam means comprising follower connected to said label carrier and a cam movable into the path of said follower responsive to operation of said pressure responsive device when said label carrier fails to pick up a label.

33. A machine as set forth in claim 32, said pressure responsive device comprising a switch, said means for effecting suction comprising a suction line connected to said label carrier, said switch being connected to said line and having elements actuatable responsive to a rise in pressure in said line effected by failure of said carrier to pick up a label, said actuatable cam means comprising a solenoid operated cam, and means comprising control circuitry intermediate said switch and said solenoid operated cam to effect actuation of said cam for engagement by said follower for rocking said label carrier.

34. In a carton labeling machine, a rotary drum having a label carrier provided with means for gripping and removing a label from a magazine and subsequently bringing said label carrier into contact with a glue coating device and then subsequently into position for depositing said label on a carton or the like, means for mounting said label carrier for movement relative to said drum and an anti-fouling means for moving said label carrier away from said glue coating device responsive to failure of said label carrier to pick up a label prior to moving to said glue coating device.

35. In a machine as set forth in claim 34, means for effecting suction through said label carrier for gripping a label and comprising a suction line and said anti-fouling means comprising a pressure responsive device connected to said suction line and actuating means operative to move said label carrier away from said glue coating device to prevent engagement therewith responsive to operation of said pressure responsive device when said label carrier fails to pick up a label.

36. In a machine of the kind described, a rotary element, a fixed cam, a label carrier having a cam follower and being carried by said rotary element and engageable with said fixed cam, said fixed cam having a notch for receiving said cam follower to effect a movement of said label carrier for disposing said label carrier at a predetermined position with respect to a label magazine to grip a label, a resilient bias means operative on said cam follower operative to maintain said cam follower in said notch to position said rotary element at a predetermined point with respect to said magazine and to hold said rotary element stationary while said label carrier is gripping a label.

37. In a machine as set forth in claim 36, means for rocking said carrier away from a glue coating device in the course of rotation of said rotary element and comprising a cam means having a member longitudinally movable over a portion of the surface of said fixed cam so as to be in the path of movement of said cam follower to be engaged thereby to effect said rocking of said label carrier to prevent engagement thereof with said glue coating device responsive to failure of said carrier to pick up a label.

38. In a machine of the class described, a rotary drum, a label carrier carried thereby for depositing labels on a carton, a pressure pad within said drum and radially reciprocal with respect thereto, means for effecting reciprocation of said pressure pad against a label subsequent to deposit by said label carrier, said pressure pad being of compressible construction and having a portion initially engageable with said label so as to exert a greater pressure during the course of compression on the portion of the label initially engaged as said pressure pad reciprocates against said label.

References Cited

UNITED STATES PATENTS

| | | | |
|---|---|---|---|
| 2,195,111 | 3/1940 | Kagley | 156—566 X |
| 2,214,096 | 9/1940 | Weiss | 156—568 |
| 2,657,816 | 11/1953 | Everett | 156—567 X |
| 2,764,408 | 9/1956 | Weiler | 156—568 X |
| 2,878,953 | 3/1959 | Mitchell | 156—566 |
| 3,154,434 | 10/1964 | Rosenthal | 118—245 |
| 3,306,803 | 2/1967 | Holstein | 156—357 |

HAROLD ANSHER, Primary Examiner

T. R. SAVOIE, Assistant Examiner

U.S. Cl. X.R.

156—567, 571, 578; 198—20; 271—29